(12) United States Patent
Roberson et al.

(10) Patent No.: US 6,765,567 B1
(45) Date of Patent: Jul. 20, 2004

(54) METHOD AND APPARATUS FOR PROVIDING AND ACCESSING HIDDEN TOOL SPACES

(75) Inventors: George G. Roberson, Seattle, WA (US); Matthew J. Conway, Seattle, WA (US); Jeffrey S. Pierce, Pittsburgh, PA (US); Maarten R. van Dantzich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/541,133

(22) Filed: Mar. 31, 2000

Related U.S. Application Data
(60) Provisional application No. 60/127,997, filed on Apr. 6, 1999.

(51) Int. Cl.[7] .............................................. G06T 15/00
(52) U.S. Cl. ...................................................... 345/419
(58) Field of Search ................................ 345/419, 420, 345/763, 782, 805, 809, 848, 474, 473, 475

(56) References Cited

U.S. PATENT DOCUMENTS

| | | | |
|---|---|---|---|
| 5,544,295 A | 8/1996 | Capps ......................... | 395/152 |
| 5,644,737 A | 7/1997 | Tuniman et al. ............. | 395/352 |
| 5,724,492 A | 3/1998 | Matthews, III et al. ..... | 395/119 |
| 5,754,809 A | 5/1998 | Gandre ....................... | 395/343 |
| 5,808,613 A | 9/1998 | Marrin et al. ............... | 345/355 |
| 5,835,692 A | 11/1998 | Cragun et al. .............. | 395/119 |
| 5,838,326 A | 11/1998 | Card et al. .................. | 345/355 |
| 5,861,885 A | 1/1999 | Strasnick et al. ........... | 345/355 |
| 5,874,956 A | 2/1999 | LaHood ....................... | 345/339 |
| 5,880,725 A | 3/1999 | Southgate ................... | 345/340 |
| 5,880,733 A | 3/1999 | Horvitz et al. .............. | 345/355 |
| 6,002,403 A | 12/1999 | Sugiyama et al. .......... | 345/355 |
| 6,088,032 A | 7/2000 | Mackinlay ................... | 345/355 |
| 6,115,043 A | 9/2000 | Levine et al. ............... | 345/350 |
| 6,229,542 B1 | 5/2001 | Miller ......................... | 345/358 |
| 6,313,855 B1 | 11/2001 | Shuping et al. ............. | 345/854 |
| 6,346,956 B2 | 2/2002 | Matsuda ..................... | 345/848 |
| 6,486,895 B1 | 11/2002 | Robertson et al. .......... | 345/776 |
| 6,590,593 B1 * | 7/2003 | Robertson et al. .......... | 345/782 |
| 6,628,307 B1 * | 9/2003 | Fair ............................ | 345/763 |

FOREIGN PATENT DOCUMENTS

| WO | WO 97/41506 | 11/1997 |
|---|---|---|
| WO | WO 97/45782 | 12/1997 |

OTHER PUBLICATIONS

How to User Microsoft Windows NT 4 Workstation, Copyright 1996.

"Moving Objects in Space: Exploiting Proprioception in Virtual–Environment Interaction," Computer Graphics Proceedings, Annual Conference Series, XP–000765798, pp. 19–26 (1997).

(List continued on next page.)

*Primary Examiner*—Phu K. Nguyen
(74) *Attorney, Agent, or Firm*—Theodore M. Magee; Westman, Champlin & Kelly, P.A.

(57) ABSTRACT

A method and a computer-readable medium are provided for generating an interface in a personal computer system. The method includes is playing a primary view of a three-dimensional environment from the egocentric perspective of a virtual person in the environment. A glancing function is then performed, which provides animated movement of the virtual person's head to reveal a three-dimensional tool space that is normally hidden from view. In one embodiment, the three-dimensional tool space moves with or is linked to the virtual person's body so that it travels through the environment with the virtual person's body. In other embodiments, the tool space is associated with an object in the three-dimensional environment.

46 Claims, 21 Drawing Sheets

OTHER PUBLICATIONS

"Wayfinding Strategies and Behaviors in Large Virtual Worlds," Conference on Human Factors in Computing Systems, pp. 142–149 (1996).

Benjamin B. Bederson et al., "Local Tools: An Alternative to Tool Palettes," User Interface Software and Technology, pp. 169–170 (1996).

Mark Billinghurst et al., "3D Palette: A Virtual Reality Content Creation Tool," Virtual Reality Software and Technology, pp. 155–156 (1997).

Jeff Butterworth et al., "3DM: A Three Dimensional Modeler Using a Head–Mounted Display," Symposium on Interactive 3D Graphics, pp. 135–138 (1992).

Brookshire D. Conner et al., "Three–Dimensional Widgets," Symposium on Interactive 3D Graphics, pp. 183–188 (1992).

T. Todd Elvins et al., "3D Thumbnails for Wayfinding in Virtual Environments," User Interface Software and Technology, pp. 21–30 (1997).

Ken Hinckley et al. "Passive Real–World Interface Props for Neurosurgical Visualization," Conference on Human Factors in Computing Systems, pp. 452–458 (1994).

Randy Pausch et al., "Navigation and Locomotion in Virtual Worlds via Flight Into Hand–Held Miniatures," ACM SIGGRAPH Conference Proceedings, pp. 399–400 (1995).

Abigail J. Sellen et al., "The Role of Visual and Kinesthetic Feedback in the Prevention of Mode Errors," INTERACT '90, pp. 667–673 (1990).

Richard Stoakley et al., "Virtual Reality on a WIM: Interactive Worlds in Miniature," Conference on Human Factors in Computing Systems, pp. 265–272 (1995).

Colin Ware et al., "Fish Tank Virtual Reality," Conference on Human Factors in Computing Systems, pp. 37–42 (1993).

Bukowski, R., et al., "Object Associations: A Simple and Practical Approach to Virtual 3D Manipulation," Proceedings of Symposium on Interactive 3D Graphics, pp. 131–138 (1995).

Czerwinski, M., et al., "The Contribution of Thumbnail Image, Mouse–Over Text and Spatial Location Memory to Web Page Retrieval in 3D," Proceedings of Interact '99, pp. 163–170.

Kandogan E., et al., "Elastic Windows: Evaluation of Multi–Window Operations," CHI'97 ACM, pp. 250–257 (1997).

Morris, J., et al., "A Distributed Personal Computing Environment," CACM, 29(3), pp. 184–201 Mar. 1986).

Robertson, G., et al., "Data Mountain: Using Spatial Memory for Document Management," UIST '98, ACM, pp. 153–162 (Nov. 1998).

Feiner, S., et al., "Windows on the World: 2D Windows for 3D Augmented Reality," Proceedings of ACM UIST '93 Symposium on User Interface Software & Technology, pp. 145–155 (Nov. 1993).

Henderson, A., et al., "The Use of Multiple Virtual Workspaces to Reduce Space Contention in a Window–Based Graphical User Interface," ACM Transactions on Graphics 5, 3, pp. 211–243 (1986).

Robertson, G., et al., "Information Visualizaton Using 3D Interactive Animation," CACM, 36, 4, pp. 57–71 (1993)

"Practical 3D User Interface Design: Siggraph '96," Organizer: Daniel C. Robbins, Microsoft Corporation, 30 pages.

Summary of Video Entitled "CHIMP System," by Mark Mine, University of North Carolina, 1 page (1996).

How to User Microsoft Windows NT 4 Workstation, Copyright 1996.

* cited by examiner

METHOD AND APPARATUS FOR PROVIDING AND ACCESSING HIDDEN TOOL SPACES

REFERENCE TO RELATED APPLICATIONS

The present application claims priority from a United States Provisional application filed Apr. 6, 1999, having Ser. No. 60/127,997, and entitled METHOD AND APPARATUS FOR PROVIDING AND ACCESSING HIDDEN TOOL SPACES.

BACKGROUND OF THE INVENTION

The present invention relates to computer interfaces. In particular, the present invention relates computer display interfaces.

For some time, personal computers have been used to construct and display three-dimensional environments on two-dimensional display screens. Such displayed environments are common in many types of games such as flight simulators, driving simulators, and role-playing adventure games. Recently, there has been interest in providing a three-dimensional computerized desktop that allows the user to manipulate files, activate applications, and traverse networks such as the Internet.

Within such a three-dimensional environment, the user is modeled as a camera mounted in a vehicle that can move along and/or above the landscape of the environment. In some applications, the vehicle is invisible, in other applications a portion of the vehicle can be seen through the view provided by the camera.

To navigate through the three-dimensional environment, the user manipulates a set of controls to move the vehicle. For example, the user may move a computer mouse forward, backward, left and right to move the vehicle in those directions along the three-dimensional landscape. In other applications, a button or wheel controls the speed of the vehicle and a joystick, steering wheel, or mouse controls the direction that the vehicle travels. In three-dimensional desktop applications, a two-dimensional graphical user interface is often provided at the bottom of the display. By selecting one of the directional control buttons displayed in the interface, the user can control the direction the vehicle moves. Such an interface allows the user to select items in the three-dimensional environment with their mouse without moving the vehicle.

Occasionally, a user will want to link an object to the vehicle so that the object moves with the vehicle as the vehicle moves through the landscape. This object can either be an object the user finds in the three-dimensional environment or a set of tools provided by some application. In one system of the prior art, such linking allows an object displayed in the three-dimensional environment to move with the vehicle. (See Robertson et al., "Fix and Float Object Movement by Egocentric Navigation", USER INTERFACE SOFTWARE AND TECHNOLOGY, pp. 149–150, 1997). However, the selected object remains in the displayed view while it is being moved. This obstructs the view provided to the user for navigation and limits the actions the user can perform while they are navigating through the environment.

In another prior art system, a set of two-dimensional tool icons travel with the user. (See the adventure game "Goosebumps: Escape from Horrorland" by Dreamworks Interactive, 1996). The two-dimensional tool icons represent tools that the user's character may carry and use during the game. During normal navigation through the environment, the tool icons cannot be seen. However, if the user moves the display cursor to the bottom of the screen, the three-dimensional landscape shifts upward to expose a two-dimensional surface containing two-dimensional tool icons. When the user selects an icon, the tool represented by that icon is automatically placed in the character's hand and the tool that was in the character's hand is removed. When the user moves the cursor to the top of the screen, the two-dimensional surface disappears. This prior art system does not allow the user to move objects around on the tool surface. In addition, the user is not able to drag-and-drop a tool from the two-dimensional tool surface into the three-dimensional environment.

In elaborate Virtual Reality (VR) systems, where multiple sensors are actually attached to the user, the problem of carrying objects in a three-dimensional environment has been addressed by providing storage areas that are tied to the user's virtual vehicle. Examples include tool pallets that attach to the user's virtual hand and allow the user to add and modify objects on the pallet. Other examples include miniature models of a three-dimensional environment that are held in the user's hand. By manipulating objects in the model, their counterpart in the environment is moved in the same manner. Objects from within the miniature model can also be dragged from the model to the environment.

To achieve these functions, Virtual Reality systems rely on a large number of sensor inputs and a complex control system. These inputs include head mounted sensors that measure the three-dimensional position and rotation of the user's head. The inputs also include sensory inputs on the hand that determine the location of the user's hand in space and whether the hand is opened or closed. Since these complex inputs are not available in most personal computers, there is currently no practical way to directly apply the three-dimensional object manipulation and navigation controls found in Virtual Reality systems to a personal computer system without the addition of expensive and exotic hardware.

SUMMARY OF THE INVENTION

A method and a computer-readable medium are provided for generating an interface in a personal computer system. The method includes displaying a primary view of a three-dimensional environment from the egocentric perspective of a virtual person in the environment. A glancing function is then performed that generates animated movement on the display to reveal a three-dimensional tool space that is normally hidden from view. In one embodiment, the three-dimensional tool space moves with or is linked to the virtual person's body so that it travels through the environment with the virtual body. In other embodiments, the tool space is associated with an object in the three-dimensional environment.

DETAILED DESCRIPTION OF ILLUSTRATIVE EMBODIMENTS

Figure 1:
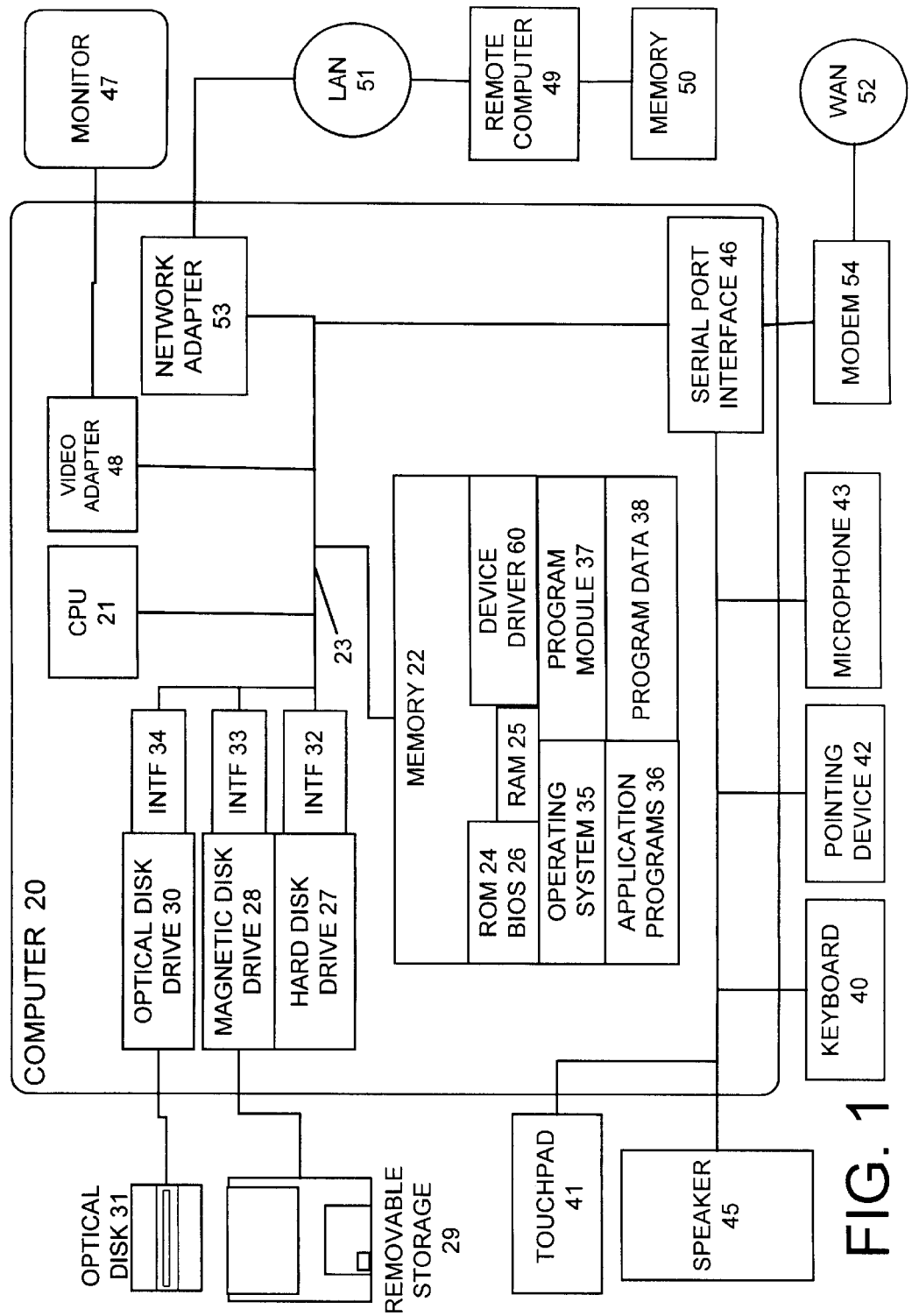
FIG. 1 is a plan view of a general computing environment for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, a touchpad 41, a pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise wide computer network Intranets, and the Internet.

When used in a LAN networking environment, the personal computer 20 s connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Embodiments of the present invention provide a three-dimensional environment for a personal computer that includes three-dimensional tool spaces that travel with the user's vehicle. The tool spaces hold objects that can be moved within the tool space and dragged from the tool space into the three-dimensional environment. Other embodiments include tool spaces that are associated with three-dimensional objects in the environment.

Figure 2:
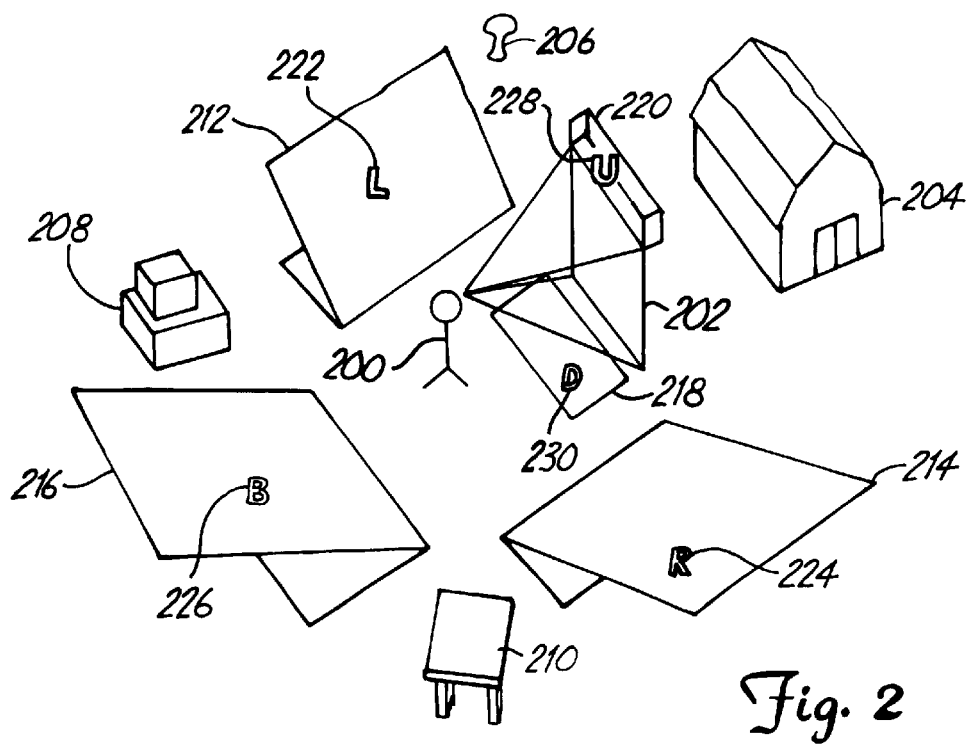
FIG. 2 is a perspective view of a computer generated three-dimensional environment of one embodiment of the present invention.

FIG. 2 provides a perspective view of a computer-generated three-dimensional environment of one embodiment of the present invention. In the environment, the user's virtual body is represented by a "stick-figure" 200 and the user's view frustum is represented by a view box 202. In the description below, view box 202 is sometimes referred to as being provided by a camera held by the user's virtual body or as being provided by the virtual body's head. In some embodiments, the user's virtual camera or virtual head has six-degrees of freedom relative to the user's virtual body such that the camera may pivot while the body remains stationary.

The three-dimensional environment of FIG. 2 contains several three-dimensional objects that are linked to the environment. These environment objects include barn 204, tree 206, blocks 208 and table 210. The three-dimensional environment also includes a number of tool spaces including left space 212, right space 214, back space 216, down space 218, and up space 220. In the embodiment of FIG. 2, the tool spaces each provide a three-dimensional surface on which two-dimensional and three-dimensional objects may reside. For example, left space 212, right space 214, and back space 216 are each inclined plane sections that extend upward and outward from the ground near vehicle 200. Up space 218 is a three-dimensional shelf, and down space 218 is a dashboard-like plane that sits inside the vehicle.

In the embodiment of FIG. 2, each tool space is shown containing a respective three-dimensional object. Left space 212 contains L 222, right space 214 contains R 224, back space 216 contains B 226 up space 220 contains U 228, and down space 218 contains D 230. As discussed below, each of these objects, and any other objects placed in the tool spaces, may be moved within a tool space, or dragged into or out of a tool space by the user. Each tool space can include many, different types of objects including three-dimensional objects, two-dimensional icons, text, hyper-links, and icons representing other tool spaces. In other embodiments of the invention the tool spaces are two-dimensional.

Figure 3:
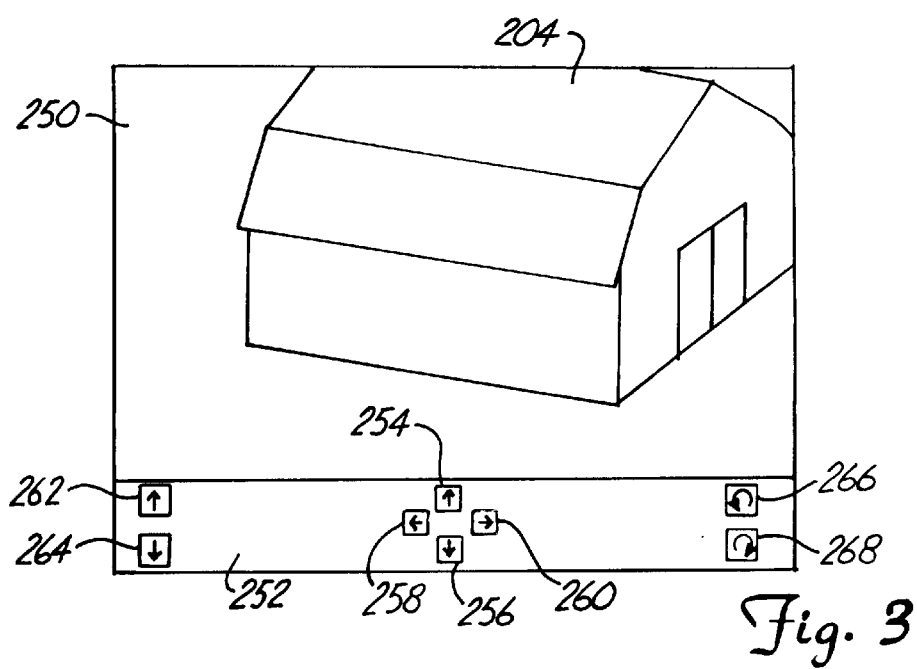
FIG. 3 is a computer-generated view provided to a user at a display based on the layout of FIG. 2.

FIG. 3 shows an example of a navigation display provided to the user in one embodiment of the invention. The display includes a viewing window 250 and a control window 252. Viewing window 250 of FIG. 3 contains the view of the three-dimensional environment provided through view box 202 of FIG. 2, and shows barn 204 from the perspective of virtual body 200 of FIG. 2.

Control window 252 contains two-dimensional graphical user interfaces that are used to move virtual body 200. The graphical user interfaces include forward and backward controls 254 and 256. By selecting one of these controls, the user can move their virtual body forward or backward in the environment. In some embodiments, if the user selects control 254 or control 256 using a mouse button, and keeps the mouse button down, they can control the speed at which their virtual body moves by moving the mouse forward or backward on the working surface. The user can also steer their virtual body left or right while it is moving forward by shifting the mouse left or right while the button that selected control 254 or control 256 remains depressed.

The virtual body may also be moved left, right, up or down using control buttons 258, 260, 262, or 264, respectively. The virtual body can also be pitched forward by control button 266 or backward by control button 268.

Figure 4:
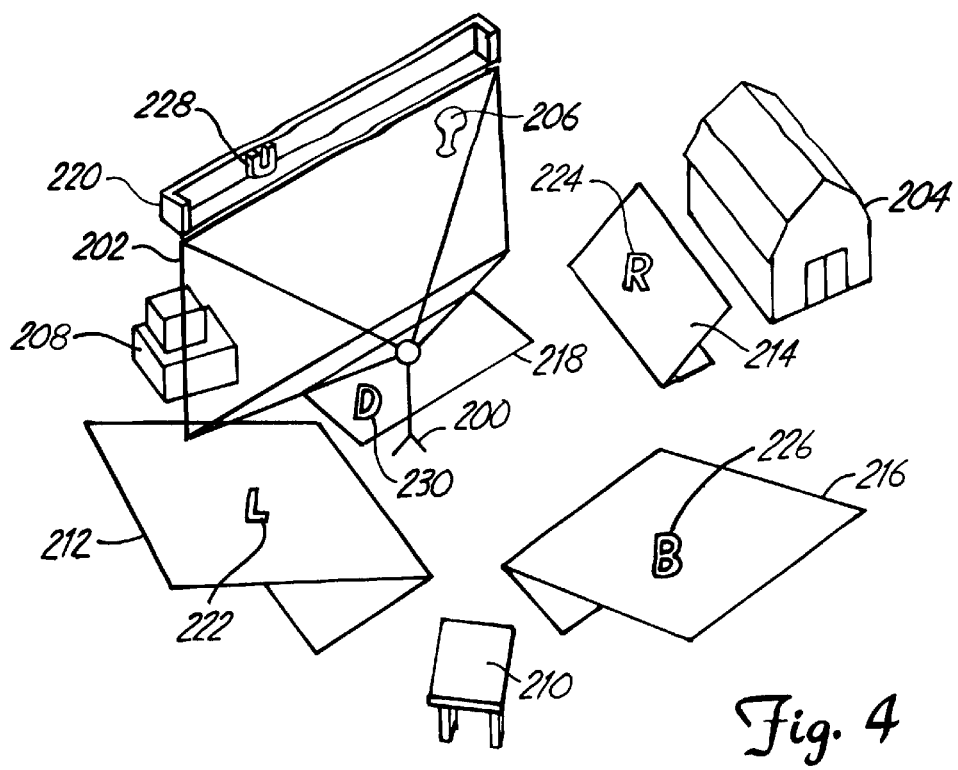
FIG. 4 is a perspective view of a computer generated three-dimensional environment after the user's vehicle has rotated ninety degrees.
Figure 5:
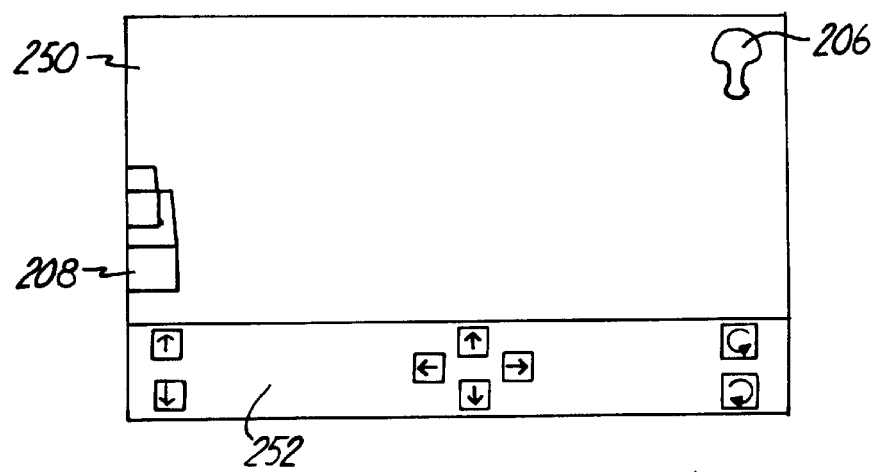
FIG. 5 is a computer-generated view provided to a user at a display based on the layout of FIG. 4.

In one embodiment, the tool spaces shown in FIG. 2 move and rotate with the user's virtual body 200 such that when virtual body 200 moves through the environment, the tool spaces remain in the same position relative to virtual body 200. For example, in FIG. 4, virtual body 200 has rotated ninety degrees to the left around an axis at the center of the virtual body. Because of this, view box 202 and all of the tool spaces 212, 214, 216, 218, and 220 have rotated around the same axis. FIG. 5 shows the display provided to the user when virtual body 200 is positioned as shown in FIG. 4.

It should be appreciated by those skilled in the art that keeping the tool spaces in the same location relative to virtual body 200 can be realized in several ways, including by specifying rotational and translational offsets for the tool spaces relative to the vehicle, by dynamically updating the tool spaces' positions and orientations, by real-time constraint solvers, or by other means.

Note that the tool spaces remain invisible to the user even though the User's virtual body moves. In order to view a tool space, the present invention provides an ephemeral and light-weight view change described herein as a glance. During this view change, the user's virtual body remains stationary but the camera or virtual head associated with the virtual body pivots relative to the virtual body. During such pivoting, one or more of the tool spaces are visible to the user.

Figure 6:
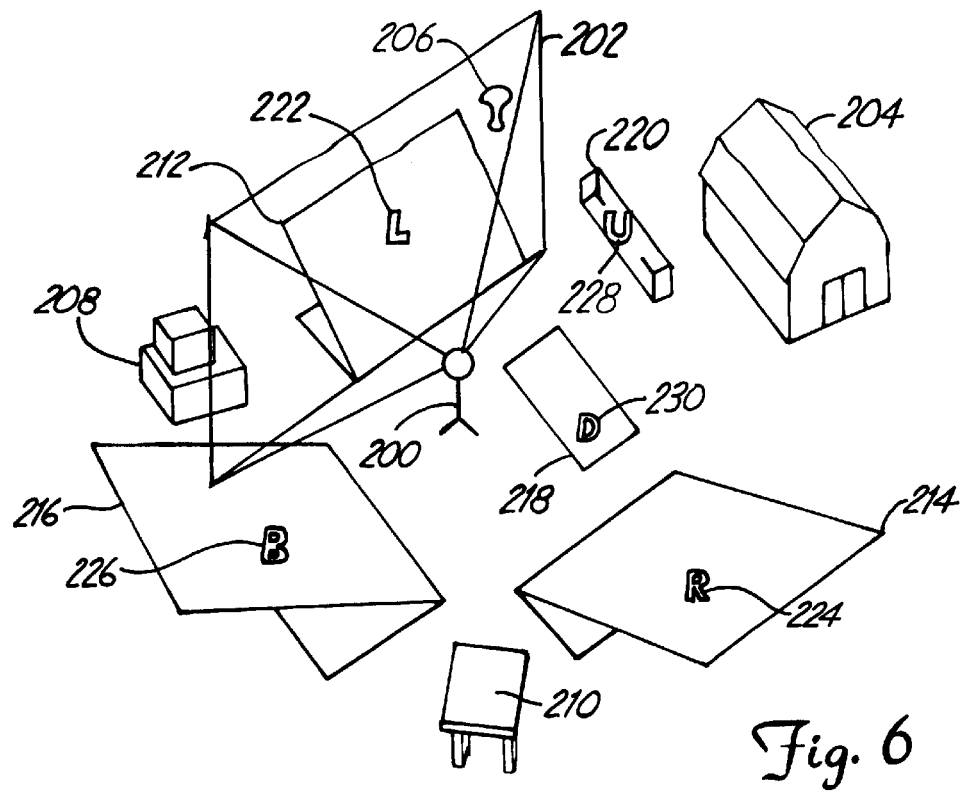
FIG. 6 is a perspective view of a computer generated three-dimensional environment during a glance left under the present invention.
Figure 7:
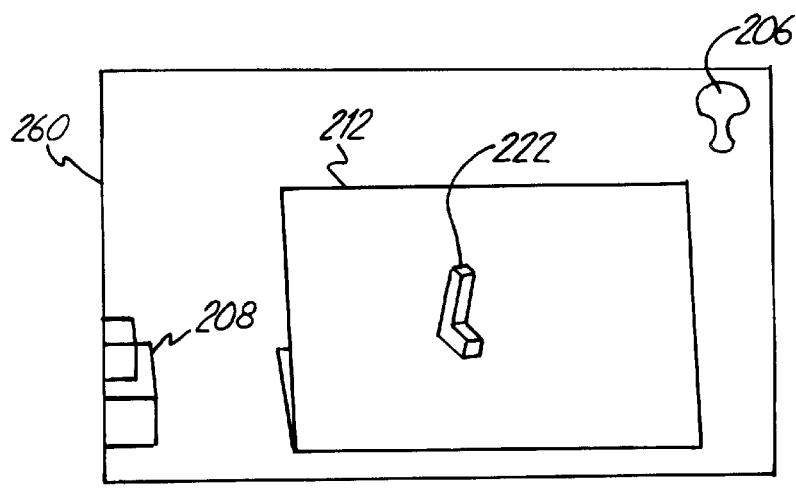
FIG. 7 is a computer-generated view provided to a user based on the layout of FIG. 6.

An example of a glance to the left is shown in FIG. 6, where view box 202 has rotated ninety degrees to the left around a vertical axis centered on virtual body 200. Since this is a glance, and the virtual body has not rotated, the tool spaces have remained stationary. Thus, left space 212 is within the view provided by view box 202 as shown in display 260 of FIG. 7. Note that tree 206 and box 208, which are linked to the three-dimensional environment, can also be seen during the glance left. Similar glances to the right and back produce similar displays of right tool space 214 and back tool space 216.

Figure 8:
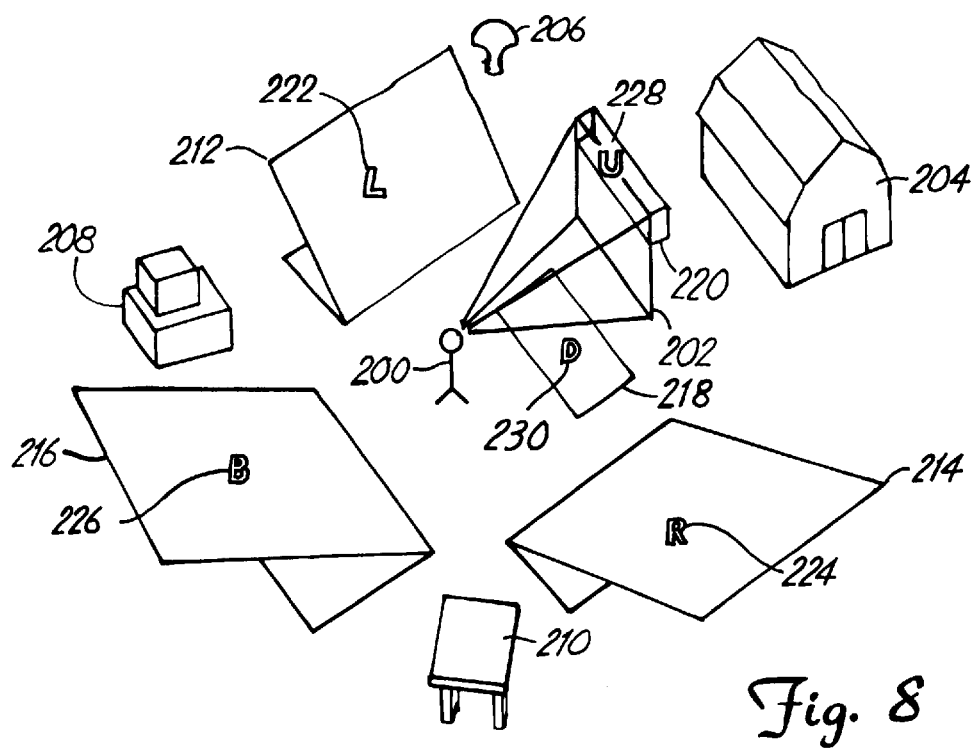
FIG. 8 is a perspective view of a computer generated three-dimensional environment during a glance up under the present invention.
Figure 9:
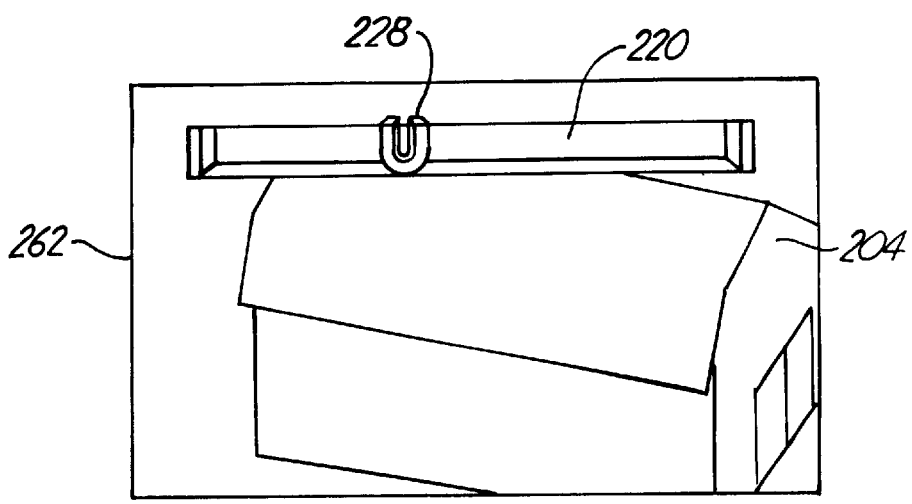
FIG. 9 is a computer-generated view provided to a user based on the layout of FIG. 8.
Figure 10:
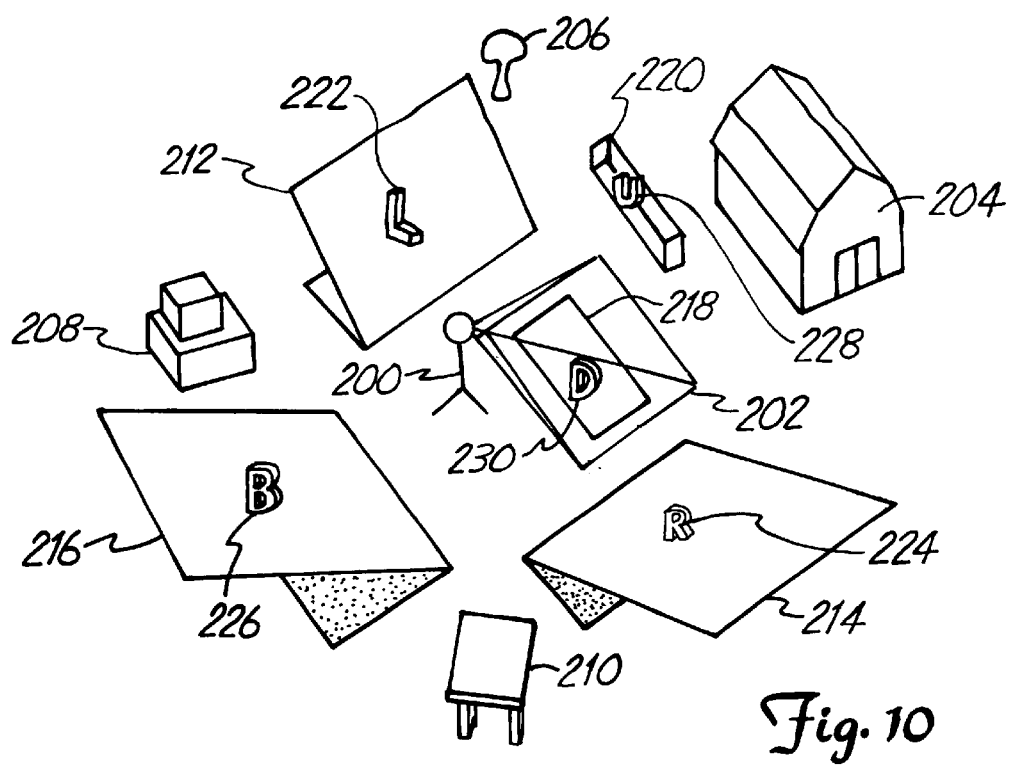
FIG. 10 is a perspective view of a computer generated three-dimensional environment during a glance down under the present invention.
Figure 11:
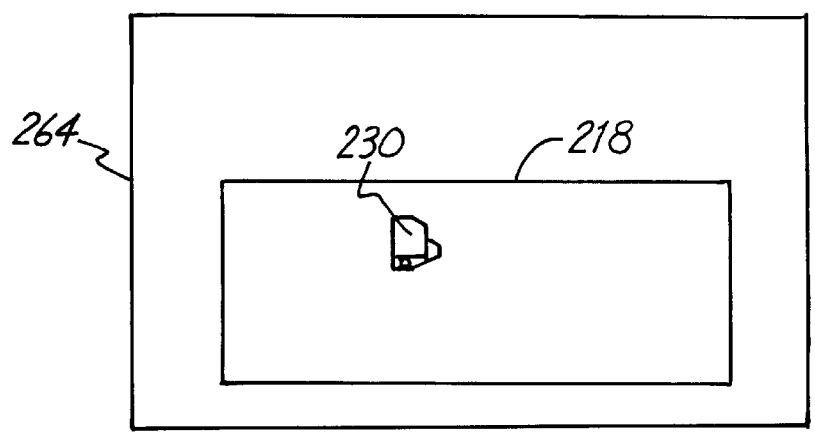
FIG. 11 is a computer-generated view provided to a user based on the layout of FIG. 10.

FIG. 8 shows a glance upward, which causes up space 220 to appear in view box 202 as shown in display 262 of FIG. 9. Note that barn 204 remains in view during the glance upward. FIG. 10 shows a glance downward, which causes down space 218 to appear in view box 202 as shown in display 264 of FIG. 11.

One aspect of the present invention is providing the ability to glance toward a tool space given the limited number of inputs available on a personal computer. In one embodiment of the invention, the glancing functions are controlled by a touchpad, which is connected to the personal computer. Under this embodiment the vehicle steering functions and object selection functions are controlled by a mouse, which is also connected to the personal computer. In other embodiments, glancing is controlled by a combination of keystrokes on a keyboard. For example, the combination of the "ALT" key and the "L" key controls the glance left function in one embodiment of the invention. In still other embodiments, glancing is controlled using the arrow keys on the keyboard.

In some embodiments of the invention that uses a touchpad to control glancing, the user indicates the direction in which they want to glance by dragging their finger across the touchpad in that direction. Such a movement is referred to as a swipe in the present application. Under an embodiment of the invention, the view caused by the glance will be maintained as long as the user's finger is in contact with the touchpad. As soon as the user releases their finger from the touchpad, view box 202 rotates back toward its previous view.

Figure 12:
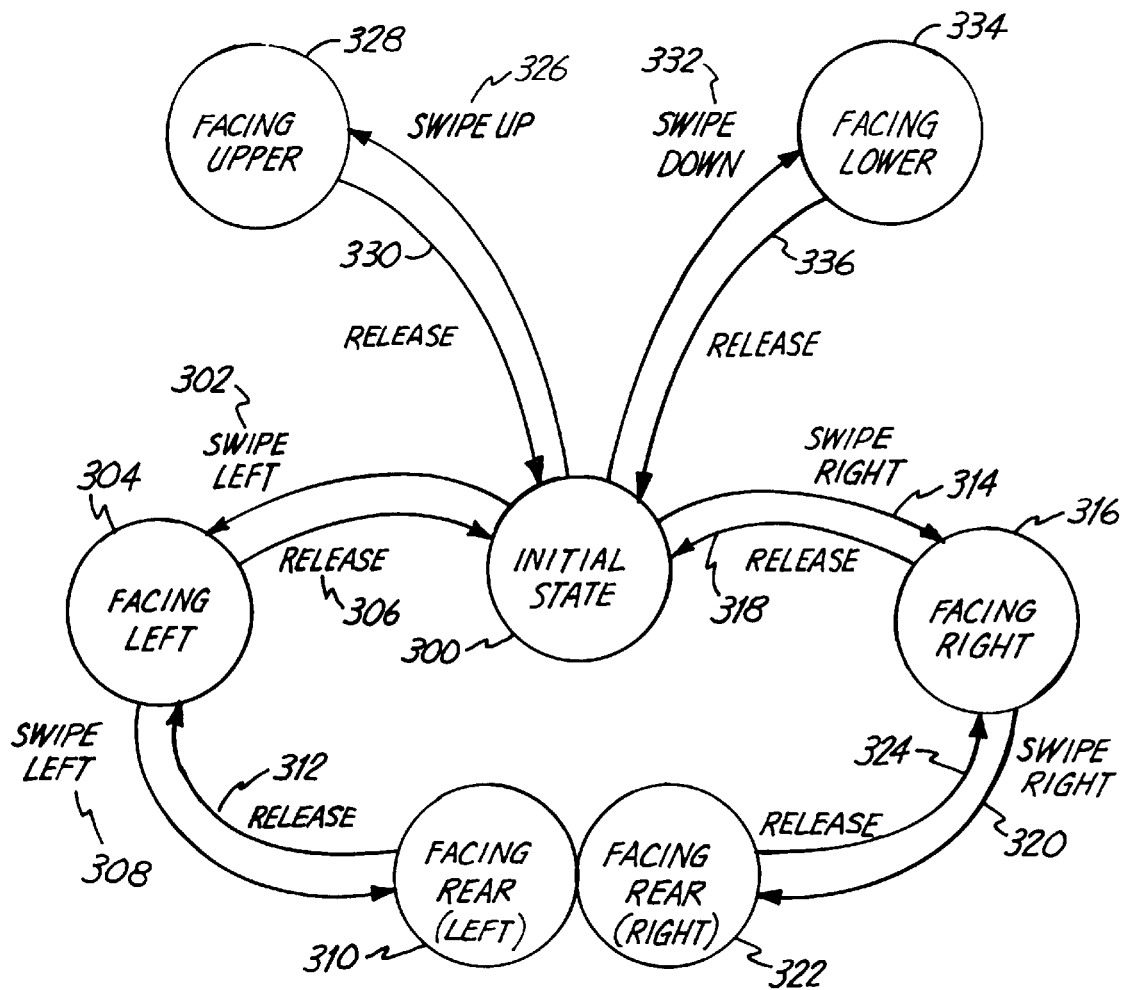
FIG. 12 is a state diagram for various glancing states under one embodiment of the present invention.

FIG. 12 provides a state diagram that is useful in describing one touchpad embodiment of the present invention. In FIG. 12 the view begins at an initial state 300 that corresponds to the state shown in FIG. 2, where view box 202 is in front of virtual body 200 and all of the tool spaces are out of view. With a swipe left 302 across the touch pad, the system rotates view box 202 so that it is facing left at state 304. In one embodiment, this rotation is performed over a period of time so that the user can perceive the rotation. If the user lifts their finger from the touch pad at state 304, the system returns to initial state 300 by rotating view box 202 back to the front. The action of releasing the touchpad is shown as release 306 in FIG. 12.

If the user swipes left on the touchpad while the system is in state 304, the system transitions along swipe left path 308 to left rear state 310. This causes view box 202 to rotate to the back of virtual body 200, thereby showing a rear tool space. In the embodiment of FIG. 12 there are two different rear tool spaces. One is reached by rotating to the left and the other is reached by rotating to the right. In some embodiments, these two tool spaces are actually a single rear tool space as shown in FIG. 2. In other embodiments, there is no rear tool space.

If the user releases the touchpad while in state 310, the system follows release path 312 back to state 304. If the user touches the touch pad while the system is in state 304, view box 202 pauses so that the user can view the left tool space.

If the user does not touch the touchpad when the system returns to state 304, view box 202 continues to rotate until it is looking forward once again at state 300.

The user may glance to the right using a swipe right 314, which places the system in state 316. A second swipe 320 to the right, rotates view box 202 to the rear of user's vehicle 200 at state 322. This allows the user to view the right rear tool space. A release 324 of the touchpad at state 322, rotates view box 202 back to the right view to expose the right tool space at state 316. If the user touches the touchpad during state 316, view box 202 pauses at the right tool space until the user releases the touchpad. When a release 318 of the touchpad occurs during state 316, the system returns to initial state 300 by rotating view box 202 back to the front.

To view the up tool space, the user performs a swipe up 326, which causes the system to enter state 328 by rotating view box 202 upward. When the touchpad is released 330, the system returns to initial state 300. To view the down tool space, the user performs a swipe down 332, which rotates view box 202 downward and places the system in state 334. A release 336 of the touch pad returns view box 202 to the forward view and the system to state 300.

Note that in the embodiment of FIG. 12, the user does not have to control the size of their swipes to control the rotation of view box 202. Any size swipe left, above some minimum length, causes a full rotation to the left tool space. Thus, the user does not have to steer the camera angle during glancing. This greatly improves user efficiency since the user does not have to concentrate on steering the view but instead can concentrate on manipulating the objects in the various tool spaces.

Although the embodiment of FIG. 12 shows that the system returns to its previous state when the user releases the touchpad, other embodiments of the invention use other cues to determine when to return to the previous state. For example, if a swipe left took the user to the left tool space, the user would return to initial state 300 by performing a swipe right. In other embodiments, a key press on the keyboard returns the system to the initial state. In still other embodiments, taking an action in the tool space, such as "double-clicking" on an object, returns the system to its initial state.

Figure 13:
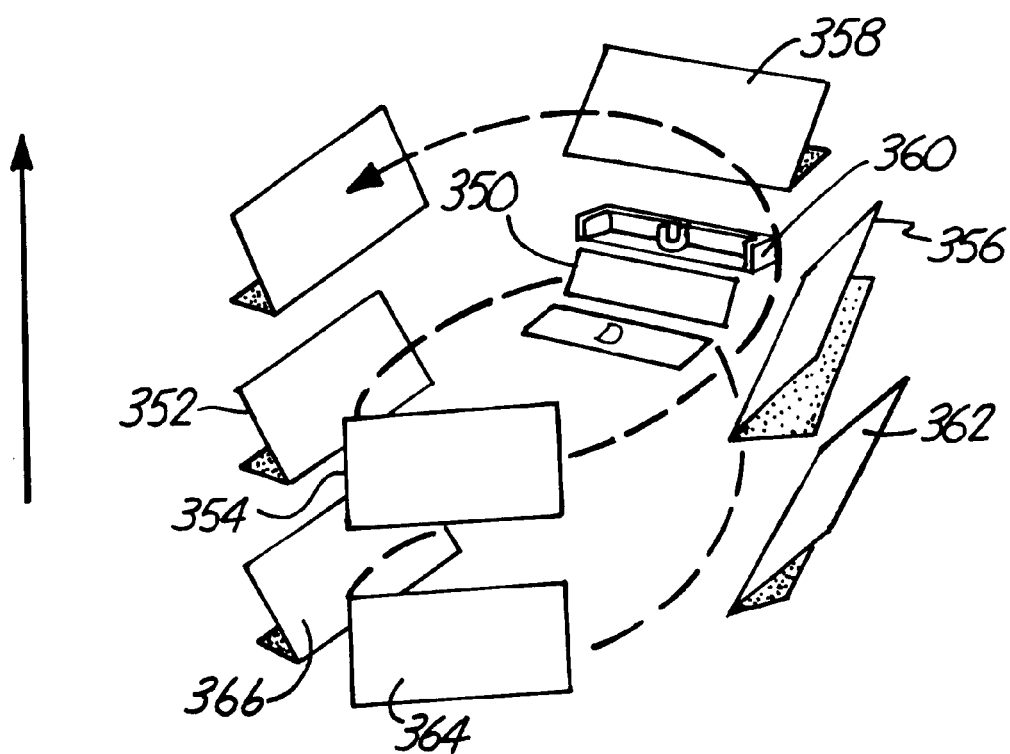
FIG. 13 is a perspective view of a layout for tool spaces under an embodiment of the invention.

In the embodiments of FIGS. 2 through 12, a glance to the left or right kept the user's view in the current plane of user vehicle 200. FIG. 13 shows an alternative embodiment where a glance left causes the user's view to climb upward as it rotates to the left and a glance right causes the user's view to drop downward as it rotates right. In particular, from forward view 350, a swipe left rotates the view to tool space 352, a second swipe left rotates the view up and back to tool space 354, a third swipe left rotates the view up to tool space 356, and a fourth swipe rotates the view up to tool space 358, which is above up tool space 360. From forward view 350, a swipe right rotates the view to tool space 362, a seconds swipe right rotates the view downward and back to tool space 364, and a third swipe right rotates the view down to tool space 366.

In the embodiments of FIGS. 2 through 13, the tool spaces have been described as being persistent in the three-dimensional environment, even when the user is not glancing at them. In other embodiments, a tool space only exists in the environment while the user is glancing at the space. In such embodiments, the user perceives that the tool space is always present and that the tool space travels with the virtual body because the tool space always appears in the same relative location during a glance.

Figure 14:
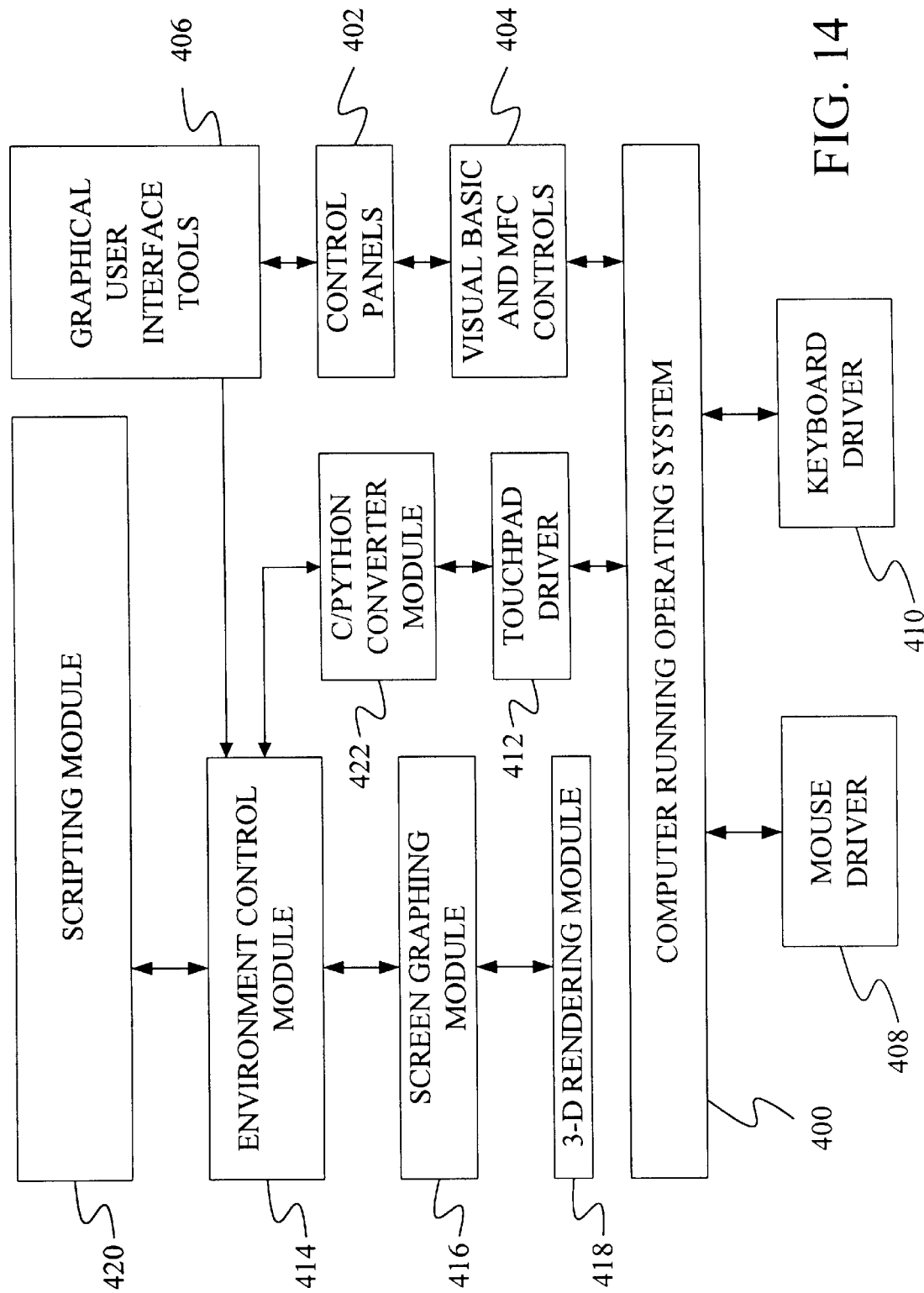
FIG. 14 is a block diagram of computer components found in one embodiment of the present invention.

FIG. 14 is a block diagram of various software components of one embodiment of the present invention. Most of the components run "on-top" of a personal computer operating system 400 such as Windows 95®, Windows 98®, Windows® 2000, or Windows NT® from Microsoft Corporation of Redmond, Wash.

As shown in FIG. 3, the display consists of a viewing window and a control window. In the embodiment of FIG. 14, the control window is defined by a control panel module 402 that uses a collection of Visual Basic controls found in Visual Basic module 404. Thus, control panel module 402 defines where the control window appears oil the screen, the location of control buttons within the window, and the size and appearance of each control button. Visual Basic module 404 performs the functions necessary to display the control window defined by control panel module 402.

The functions that are performed when a user "clicks" on a control button are defined in graphical user interface tools 406. Visual Basic module 404 determines when such "clicks" occur based on input device messages received from operating system 400. In some embodiments of operating system 400, the operating system forwards input device messages to Visual Basic module 404 from a driver such as mouse driver 408, keyboard driver 410, or touchpad driver 412, which receive data from their respective input devices.

For example, mouse driver 408 receives data from a mouse indicating when the left button of the mouse has been pressed. Based on this information, mouse driver 408 creates a mouse message that is sent to operating system 400. Operating system 400 determines that the cursor was positioned over a visual basic window when the button was pressed and therefore routes the mouse message to Visual Basic module 404. Visual Basic 404 then invokes the procedure defined by graphical user interface tools 406 for the control button under the cursor.

The functions defined by graphical user interface tools 406 are most often scripting functions that invoke programming object methods and use programming object properties supported by an environment control module 414. In one embodiment, environment control module 414 includes a set of pre-defined programming objects that represent portions of the three-dimensional environment such as the virtual body and the camera. Environment control module 414 also supports the creation of additional programming objects that represent three-dimensional structures in the environment.

Each programming object is associated with a group of properties that describe a portion of the object. Examples of programming object properties supported by environment control module 414 include the color, location, size and orientation of three-dimensional structures in the environment. The supported properties also include the location and orientation of the virtual body and the camera.

Many objects are also associated with methods that can be performed on the objects. The supported programming object methods include moving objects, rotating objects, making object invisible, and linking objects to the camera or vehicle so that the objects move with the camera or vehicle, respectively.

The programming objects supported by environment control module 414 are associated with respective three-dimensional representations through a screen graphing module 416 that includes a database of three-dimensional representations. For example, in one embodiment, screen graphing module 416 includes Computer-Aided Design (CAD) files. Screen graphing module 416 retrieves the appropriate files based on instructions from environment control module 414. It then determines coordinates for each three-dimensional object in the three-dimensional environment and the orientation of each three-dimensional object. This information along with the three-dimensional representations of the objects is provided to a three-dimensional rendering module 418, which converts the information into pixels for the display.

In one embodiment of the invention, environment control module 414 and screen graphing module 416 are part of an object oriented authoring and runtime environment known as Alice. Within Alice, the functions of screen graphing module 416 are performed by a subsystem called Ecila. The Ecila layer is written in the C/C++ programming languages and the remainder of Alice is generally written in Python, a public domain scripting language which is both embeddable and extendable in C or C++. In this embodiment, three-dimensional rendering module 418 is Microsoft's Direct 3D retained mode library.

In other embodiments of the invention, movement of the virtual body is controlled directly by keystrokes from a keyboard or input from a pointing device. In such embodiments, visual basic and MFC controls 404, control panels 402, and graphical user interface tools 406 are not present. Instead, input from the keyboard and pointing device are passed to a function in environment control module 414, which interprets the input and moves the virtual body or camera in response to the input.

As mentioned above, environment control module 414 supports the creation of programming objects. The actual code to create such objects is located in screen graphing module 416 and is invoked by scripting code, such as Python, found in scripting module 420. Through this combination of scripting code and screen graphing code, each tool space object of the present invention is created and associated with a graphical representation. The tool space objects are then positioned and oriented appropriately relative to the virtual body. Once in place, the objects in each tool space are linked to the tool space so that they remain in the same place relative to the tool space as the virtual body moves through the environment. This linking is achieved using a linking method (BecomePartOf) associated with the tool space object. In embodiments using Alice, such linking methods are supported for all displayable objects. As mentioned above, it should be appreciated by those skilled in the art that the linking mechanism that Alice uses is but one of many ways to achieve the goal of keeping one graphical object in the same relative position with respect to some other graphical object in a 3D graphical environment. The scripting code is also used to control the movement of objects relative to the tool spaces, and the properties of objects found on the tool spaces.

The glancing functions of the present invention are also controlled in part by scripting module 420 in conjunction with environment control module 414. In particular, for an embodiment using a touchpad, scripting module 420 defines the effects of a swipe in a particular direction on the touchpad. For example, in one embodiment, scripting module 420 associates a swipe left on the touchpad with the application of a rotation method to the camera object using ninety degrees as the amount of rotation, left as the direction, and some time period as the period of time over which the rotation is to take place. By keeping the virtual body object stationary, scripting module 420 ensures that the left tool space, which is linked to the virtual body, does not move during the camera rotation.

In order to implement the present invention using the Alice program with a touchpad, the present inventors found it necessary to implement a layer of C/Python glue code (422), which is a common extension mechanism for the Python programming language. This module converts Python scripting commands into C/C++ programming commands for touchpad driver 412 and converts C/C++ variables from touchpad driver 412 into Python variables.

Figure 15:
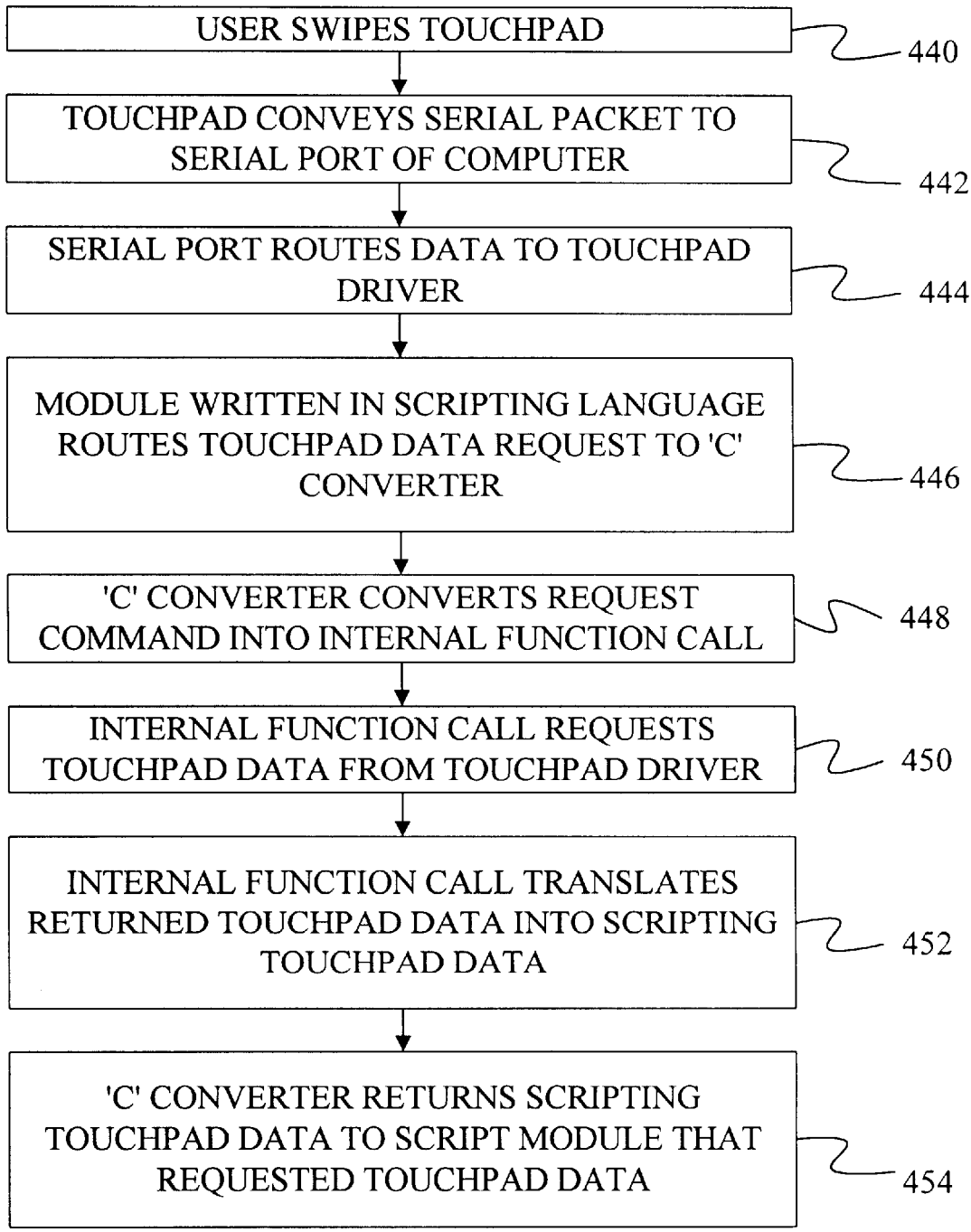
FIG. 15 is a flow diagram for the process of detecting a touchpad swipe under an embodiment of the present invention.

FIG. 15 provides a flow diagram describing the steps involved in conveying information about a swipe on a touchpad to environment control module 414. The process of FIG. 15 starts at step 440 where the user swipes the touchpad. The touchpad then converts this swipe into a set of data describing the swipe and sends the data in a serial packet to the serial port of the computer at step 442. At step 444, the serial port routes the data in the serial packet to touchpad driver 412. At step 446, a scripting function generates a request for touchpad data. This request is routed to C/Python converter module 422. At step 448, C/Python converter module 422 converts the Python based request into a C/C++ function call. The C/C++ function call then requests the touchpad data from touchpad driver 412 at step 450. The returned data is then converted by the C/C++ function call into Python based data at step 452. C/Python converter module 422 then returns the Python based data to the Python module that requested the data at step 454. Most often the Python module that requests the touchpad data is located in environment control module 414.

For some embodiments of the invention that do not include a touch pad, input from the keyboard driver or mouse driver is provided to environment control module 414 to control glancing and C/Python converter 422 is not present.

Figure 16:
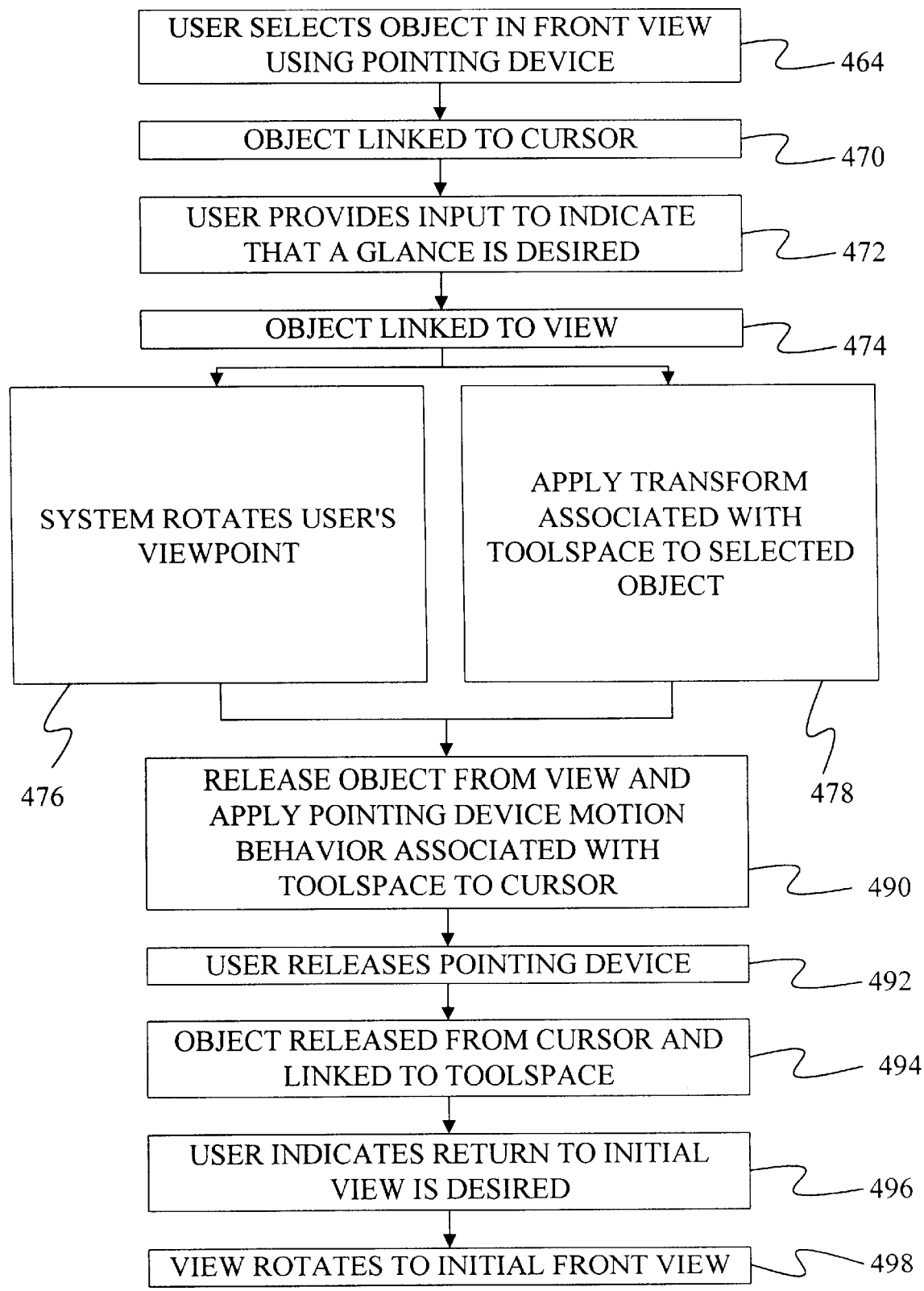
FIG. 16 is a flow diagram for dragging an object from the three-dimensional environment into a tool space.
Figure 17A:
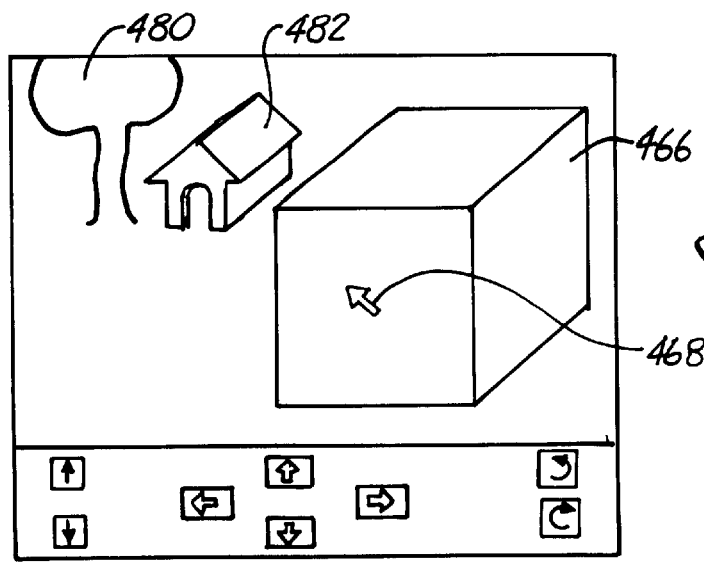
FIGS. 17A, 17B, and 17C are selected frames from a computer-generated view during the dragging operation described in FIG. 16.
Figure 17B:
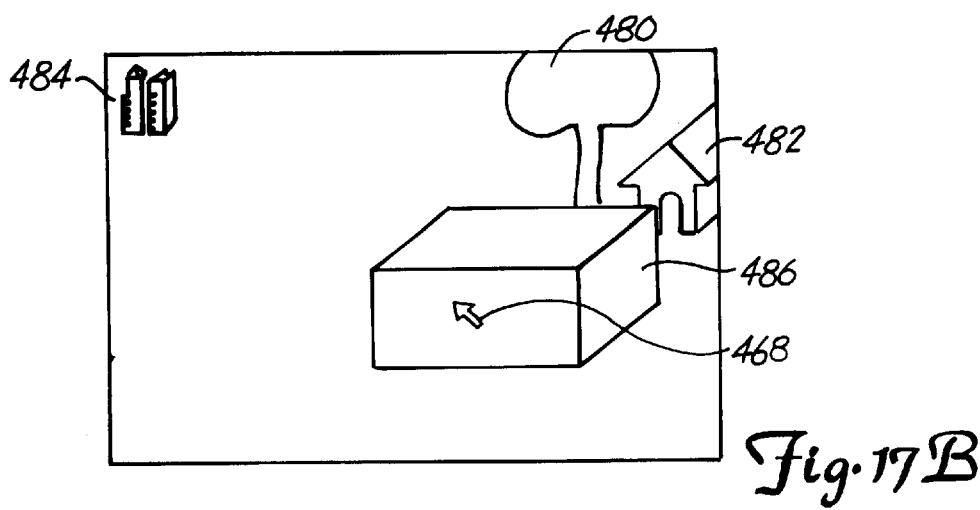
Figure 17C:
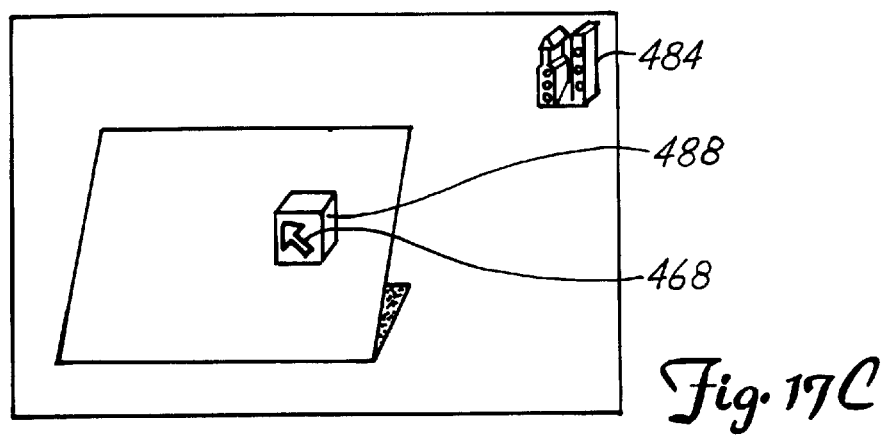

FIG. 16 shows a flow diagram describing a process of dragging an item from the three-dimensional environment into a tool space. FIGS. 17A, 17B, and 17C show "snapshots" of the view provided to the user as the object is dragged into the tool space. The process of FIG. 16 begins at step 464 where the user selects an object in view by placing the cursor over the object using a pointing device such as a mouse and "clicking" an the object by depressing a button on the pointing device. Such a selection is shown in FIG. 17A where a box 466 is selected based on the position of cursor 468. Scripting module 420 includes code that links objects to the cursor when they are selected so that the objects move with the cursor. This is shown as step 470 of FIG. 16. The link between the cursor and the selected object continues until the user release the button on the pointing device.

Those skilled in the art will recognize that other means may be used to select an item, including using a keyboard and on-screen highlighting or using pop-up or pull-down menus. In such embodiments, the object is not necessarily linked to the cursor.

At step 472, the user indicates that a glance to the left is desired. In one embodiment, the user indicates a glance by swiping on a touchpad. Based on the glance instruction, scripting code in scripting module 420 causes the selected object to be linked to the camera at step 474. This linking causes the object to rotate with the camera.

After the object is linked to the camera, two functions are performed in parallel. The first function is shown as step 476 and is a rotation of the camera to the left around an axis centered on the user's virtual body. In one embodiment, this rotation is performed slowly enough that the user can perceive the change in the landscape as the camera rotates, though the rotation rate is best determined by the needs of a specific application and the nature of the encompassing 3D environment. In the embodiment of FIG. 17, the camera rotates ninety-degrees. However, the invention is not limited to this amount of rotation and the camera can rotate more or less than ninety degrees, depending on the location of the tool space.

The second function performed in parallel with the first function is shown in step 478 and is the application of an object transform associated with the left tool space. The object transform is applied to the selected object and changes a property of the object. For example, the transform can change the appearance of objects by converting three-dimensional objects into two-dimensional icons, into smaller three-dimensional objects, into three-dimensional thumbnails, or into text. In many embodiments, appearance transformations occur in stages during the rotation such that the transformations appear as animations. Other examples of transforms include changing a programming state of the object. For instance, updating a simulation state of the object.

The effects of steps 476 and 478 are shown in FIGS. 17B and 17C. FIG. 17B shows the view during the middle of the rotation to the left tool space. Note that tree 480 and dog house 482 of FIG. 17A have shifted to the right in the display of FIG. 17B and a collection of buildings 484 has appeared in the display of FIG. 17B. Also note that box 464 has been transformed into a smaller box 486. FIG. 17C shows the view at the end of the rotation with the collection of buildings 484 on the right side of the display and box 466 fully transformed into a small box 488.

After the rotation and transformation are complete, the object is released from its link to the camera at step 490. In some embodiments, once the object is released from the camera, its motion within the tool space is governed by behavior constraints for the tool space. For example, in one embodiment, the tool space is a data mountain such as the data mountain described in a U.S. patent application having Ser. No. 09/152,491, filed on Sep. 14, 1998, and entitled METHODS, APPARATUS AND DATA STRUCTURES FOR PROVIDING A USER INTERFACE, WHICH EXPLOITS SPATIAL MEMORY IN THREE-DIMENSIONS, TO OBJECTS, which is hereby incorporated by reference. In a data mountain tool space, objects are not allowed to obscure other objects on the mountain. Thus, the motion behavior of a data mountain tool space prevents an object from being moved on the mountain in such a way that it obscures another object. Another example of movement behavior is found in the up tool space of FIG. 9. Since that tool space is represented as a shelf, objects are prevented from being stacked in front of each other on the shelf. In the up tool space of the embodiment of FIG. 9, objects can be moved left and right on the shelf but not forward and back on the shelf.

When the user releases the button on the pointing device at step 492, the object's link to the cursor is released and a new link is created between the object and the tool space at step 494. At step 496, the user indicates that they want to returns to the initial view. In response, scripting code in scripting module 420 causes the camera to rotate back to the initial view at step 498. In many embodiments, this rotation is performed over a period of time, allowing the user to see the movement of the three-dimensional environment.

Figure 18:
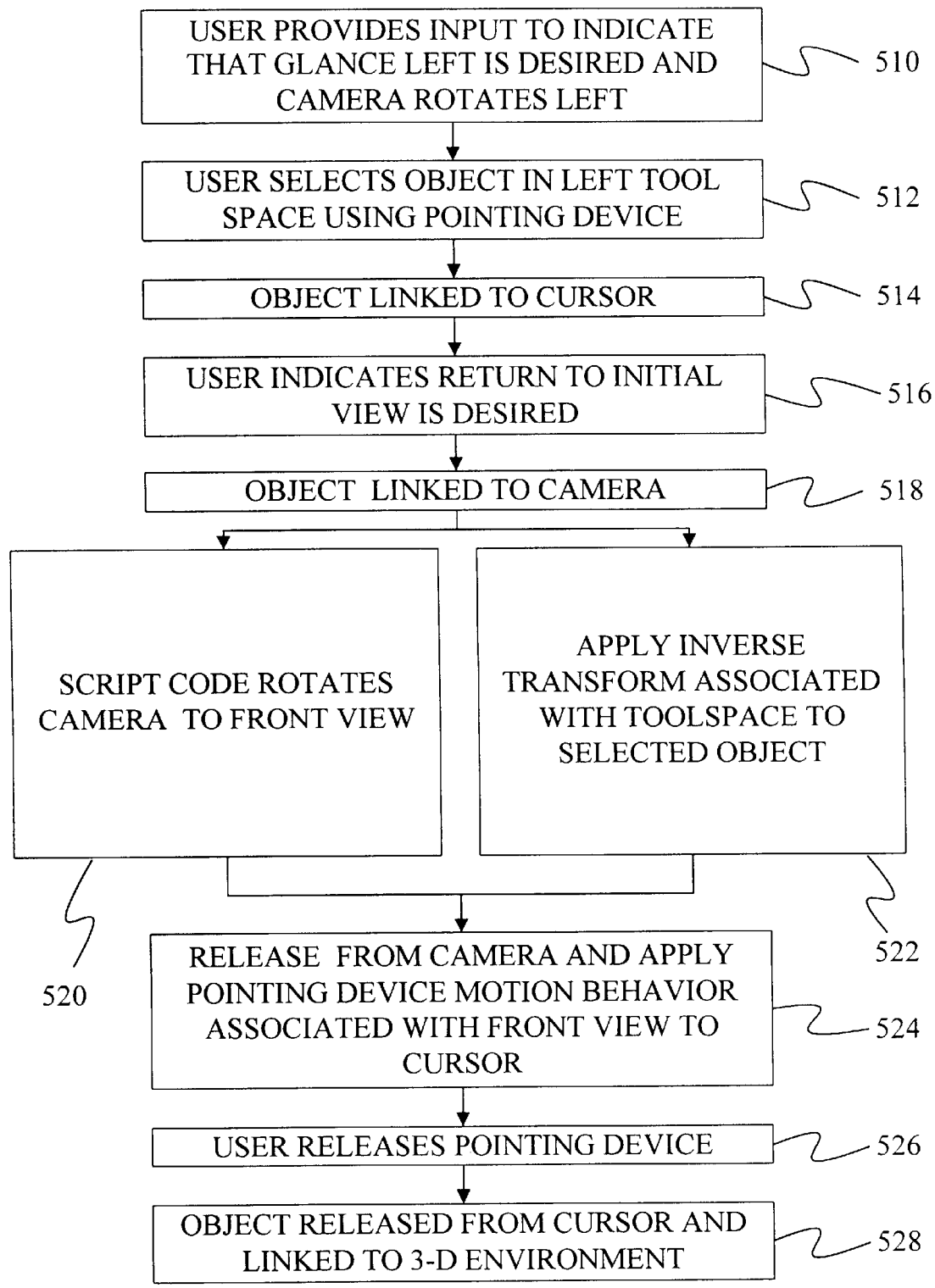
FIG. 18 is a flow diagram for dragging an object from a tool space into a three-dimensional environment.

Users may also drag items from a tool space to the three-dimensional environment. FIG. 18 is a flow diagram of the process for dragging items from a left tool space to the three-dimensional environment. At step 510, the user indicates that a glance left is desired, and scripting code causes the camera to rotate to the left. While viewing the left tool space, the user positions the cursor to select an object from the left tool space at step 512. Based on this selection, scripting code links the selected object to the cursor at step 514. At step 516, the user indicates that they want the view to return to the initial forward view. In many embodiments, this is achieved by releasing their finger from the touchpad. At step 518, the object is linked to the camera so that it rotates with the camera.

After step 518, two steps are performed in parallel. The first parallel step is step 520 in which scripting code rotates the camera so that it returns to its initial viewpoint. The second parallel step is step 522, which applies the inverse transform associated with the left tool space to the selected object. The inverse transform is the inverse of the transform applied when an object is taken from the three-dimensional environment and placed in the left tool space. For example, if objects are made smaller when they are placed in the left tool space, they are made larger when they are taken out of the tool space.

After steps 520 and 522, the object is released from its link to the camera at step 524 and motion behaviors associated with the three-dimensional environment are applied to the object. At step 526, the user releases the button on the pointing device, causing the release of the link between the cursor and the object and the creation of a link between the object and the three-dimensional environment.

Objects can also be cut-and-paste into and out of a tool space. To cut-and-paste an object into the tool space, the user selects the object in the three-dimensional environment and then invokes a cut command. This command can be invoked using the right button of a mouse to display a pop-up window and then selecting the cut command from within the window. The user then issues a glance instruction to glance at the desired tool space. The camera is then rotated to the space. Unlike the example above, however, the object cannot be seen during this rotation. Once the tool space is in view, the user invokes the paste command using a technique similar to that used to invoke the cut command and the object appears in the tool space. In many embodiments, the object is transformed by the transform associated with the tool space before it is shown in the tool space. Using a similar technique, objects may be cut from the tool space and pasted into the three-dimensional environment.

Under the present invention, an object may also be copied from the three-dimensional space and then the copy may be pasted into a tool space. The technique for doing this is the same as described above for the cut-and-paste function except that the copy command is invoked instead of the cut command. A similar technique may be used to copy an object from the tool space and paste the copy into the three-dimensional environment.

Figure 19A:
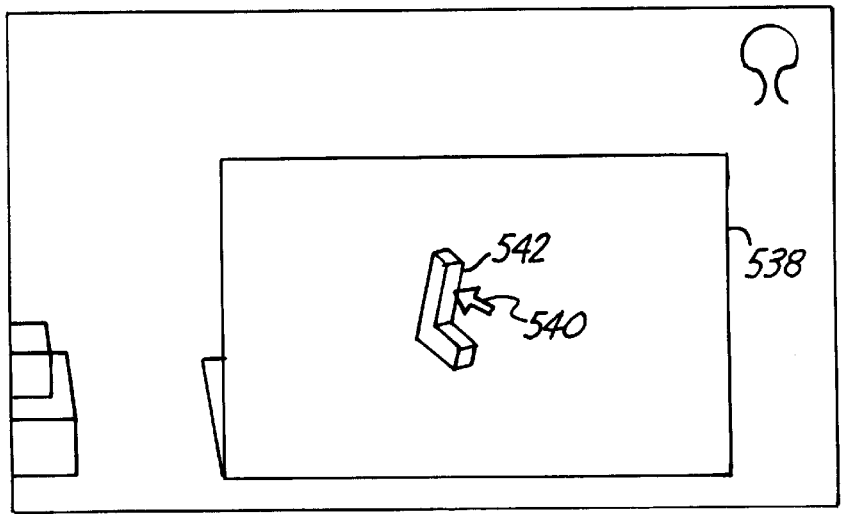
FIGS. 19A, 19B, and 19C are selected frames from a computer-generated view showing the movement of an object within a tool space during a glance.
Figure 19B:
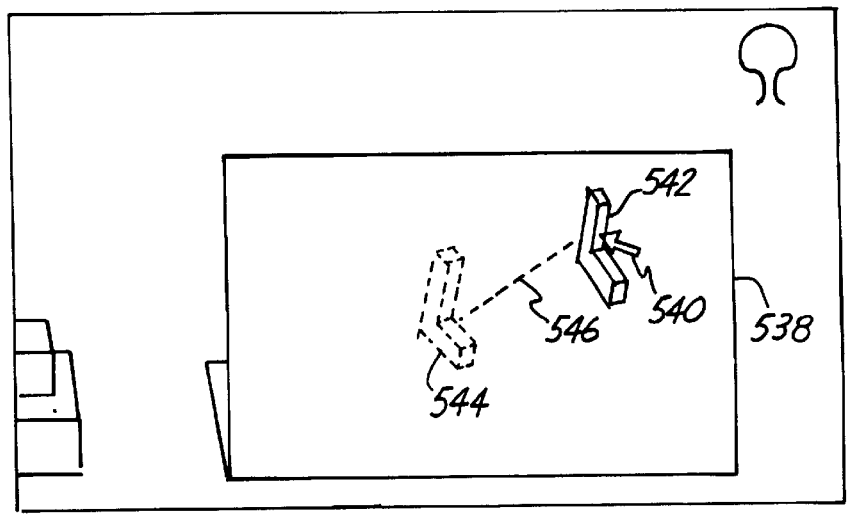
Figure 19C:
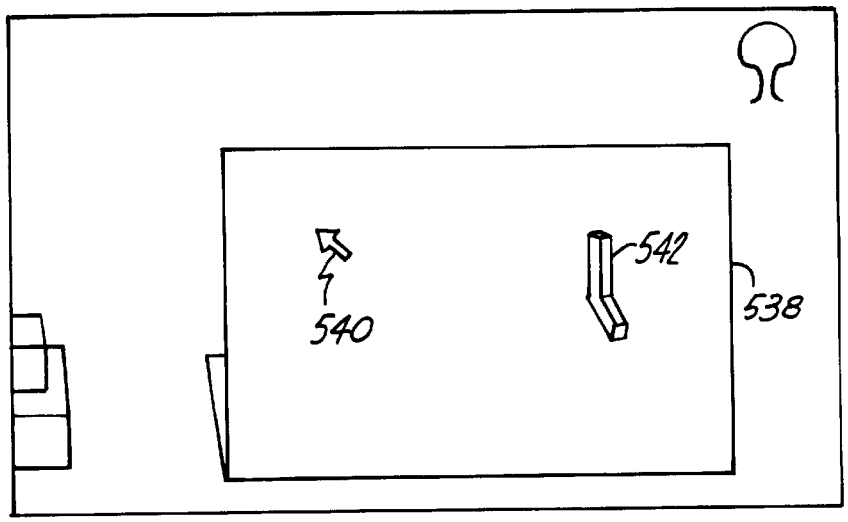

As briefly mentioned above, one of the advantages of the present invention is that objects in a tool space may be manipulated while the user is glancing at the tool space. This ability is shown in FIGS. 19A, 19B, and 19C, which are views produced during a glance at a left tool space 538. In FIG. 19A, the user positions cursor 540 over L object 542 and selects L object 542 by pressing a button on the pointing device. In FIG. 19B, the user drags L object 542 from its initial location 544 along a path 546. In FIG. 19C the user releases the button on the pointing device and moves cursor 540 away from L object 542.

Figure 20:
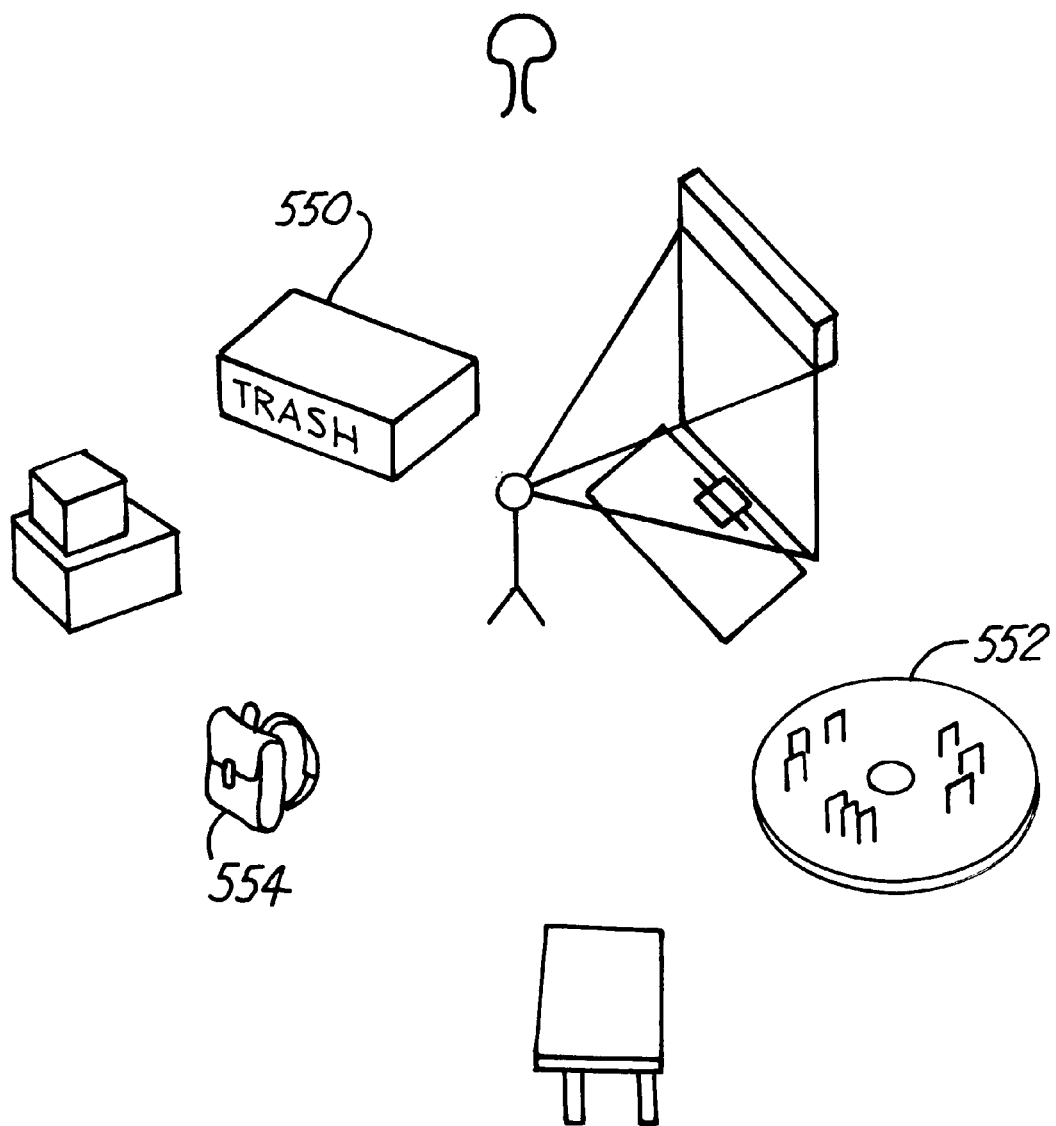
FIG. 20 is a perspective view of a computer generated three-dimensional environment showing alternative tool space shapes under the present invention.

As shown in FIG. 20, tool spaces of the present invention are not restricted to the shapes shown in FIG. 2. In fact, the tool space may have any number of shapes. In FIG. 20, examples of alternative shapes include a three-dimensional trash can 550, a computer disk 552 and a back-pack 554. Those skilled in the art will recognize that the present invention is not limited to any particular tool space shape.

Figure 21A:
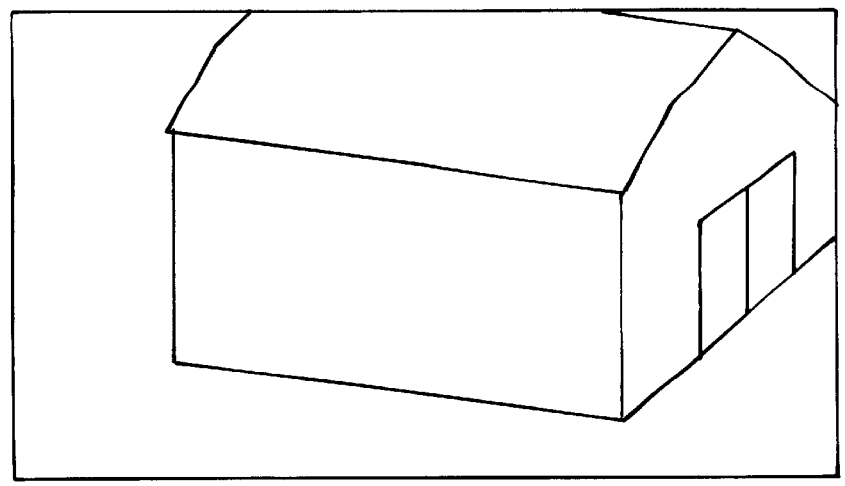
FIGS. 21A, 21B, and 21C are selected frames from a computer-generated view showing a tool space rotate into a front view during a glance.
Figure 21B:
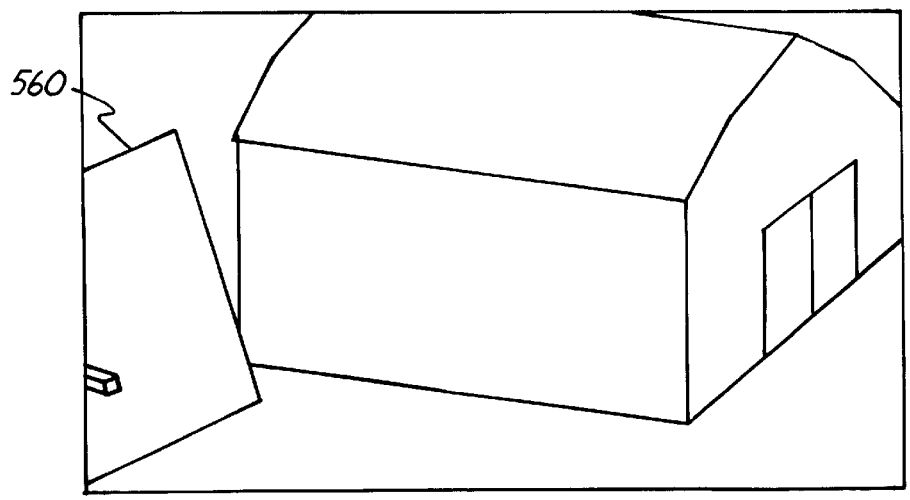
Figure 21C:
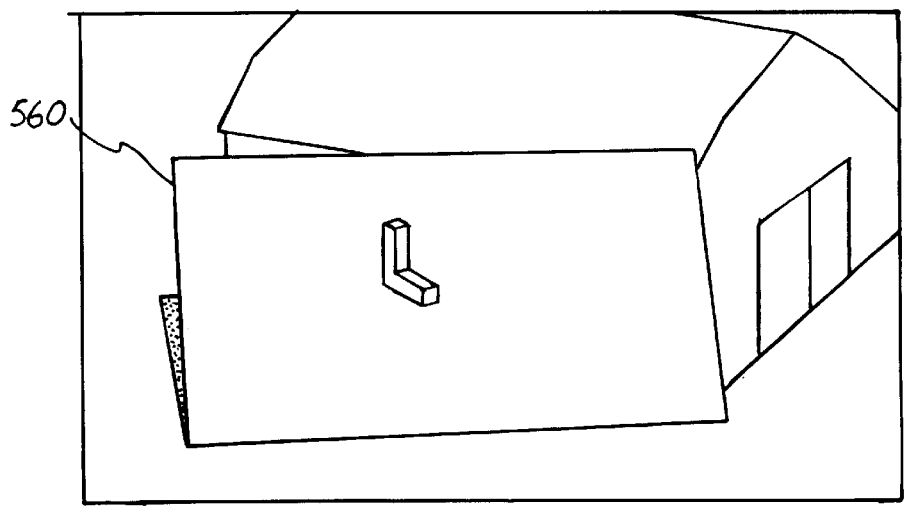

In the embodiments discussed above, a glance to a tool space caused the camera to rotate to the tool space. In other embodiments, a glance causes the tool space to rotate into the forward view of the user. FIGS. 21A, 21B, and 21C show a set of display screens that are created by an embodiment in which a left tool space 560 rotates into a forward view of the user's virtual body. Specifically, FIG. 21A represents the forward view of the virtual body. FIG. 21B shows left tool space 560 beginning to rotate into the forward view and FIG. 21C shows left tool space 560 at the end of the glance. When the user releases the glance, left tool space 560 rotates back to the left, leaving the forward view of FIG. 21A.

In other embodiments, instead of appearing in the work space, the tool space covers the entire work space in the forward view. In still other embodiments, the work space of the forward view is scaled down and/or shifted to make room for the tool space. In still further embodiments, the tool space is semi-transparent or faded to allow the user to see objects in the work space that are behind the tool space.

Although the tool space movement into view has been described above as a rotation, those skilled in the art will recognize that the tool space may also be brought into view by translating it toward the camera.

Figure 22A:
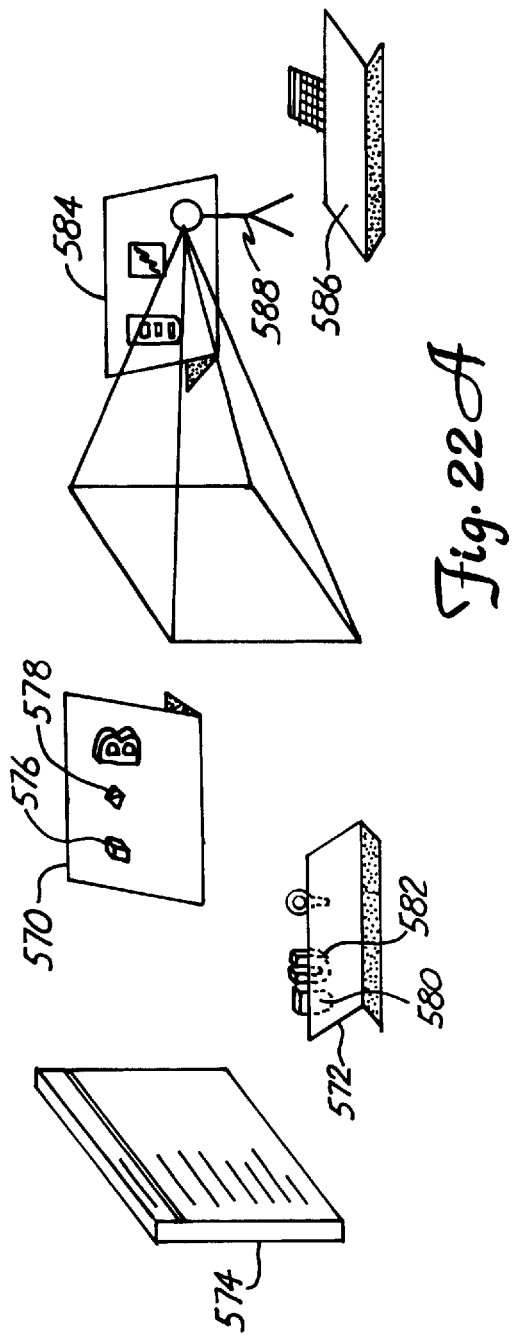
FIGS. 22A and 22B show tool spaces associated with a three-dimensional object and the inheritance of those tool spaces by the user's vehicle.

Under the present invention, tool spaces may also be associated with objects in the three-dimensional space. FIG. 22A provides an example of two tool spaces 570 and 572 that are associated with a screen object 574. Tool spaces 570 and 572 contain tool objects 576, 578, 580, and 582 that are associated with screen object 574. For example, if screen object 574 is an application screen running the word-processing program Word 97 from Microsoft Corporation, tool objects 576, 578, 580, and 582 would be tools used with Word 97.

As shown in FIG. 22A, the tool spaces associated with screen object 574 are separate from and in addition to tool spaces 584 and 586 that are associated with a user's virtual body 588. In some embodiments, however, no tool spaces are associated with the user's virtual body and the only tool spaces available are those associated with an object in the three-dimensional environment.

Figure 22B:
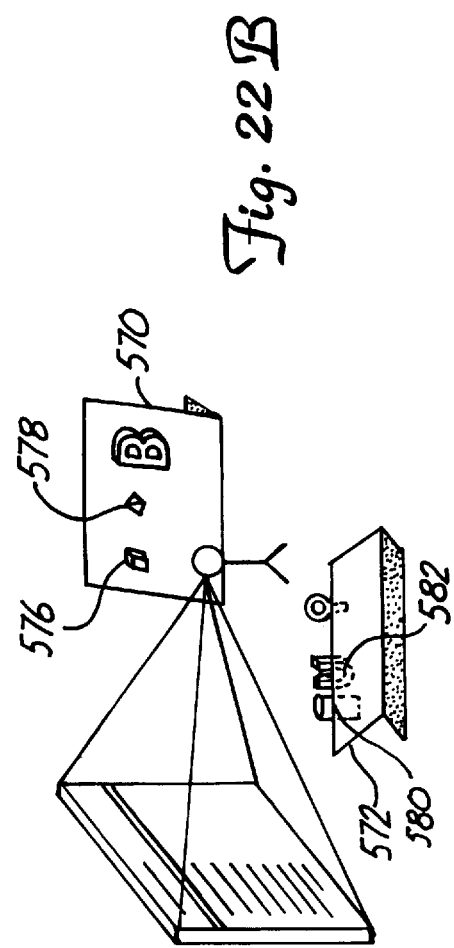

In one embodiment, where there are tool spaces associated with a three-dimensional object in the environment and tool spaces associated with the user's virtual body, the tool spaces associated with the user's virtual body are replaced by the tool spaces associated with the three-dimensional object when the user's virtual body is placed in front of the three-dimensional object. This is shown in FIG. 22B where tool spaces 570 and 572 have replaced tool spaces 584 and 586 of FIG. 22A. In other embodiments, the objects in the tool spaces associated with the three-dimensional object are combined with the objects in the tool spaces associated with the user's virtual body when the user's virtual body is placed in front of the three-dimensional object.

Figure 23:
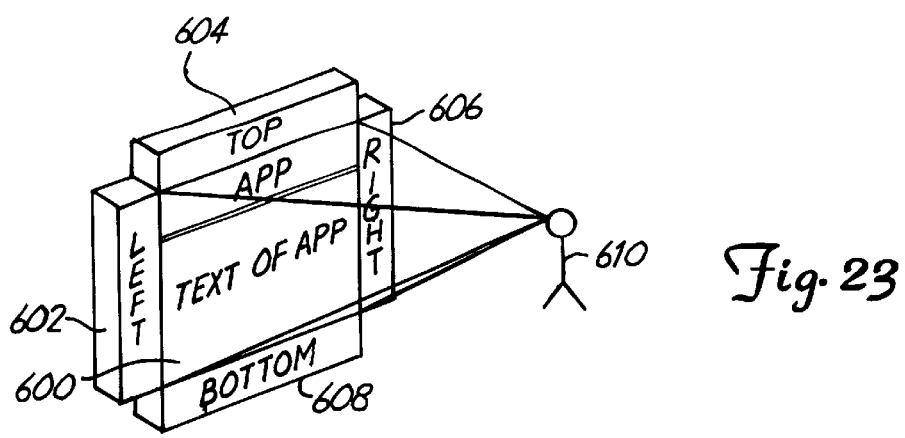
FIG. 23 shows an alternative location for tool spaces associated with a three-dimensional object in the three-dimensional environment.
Figure 24A:
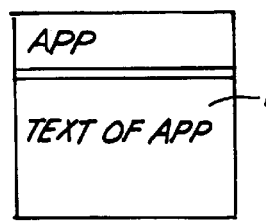
FIGS. 24A, 24B, 24C, 24D, and 24E show views from a display during an initial front view, a glance up, a glance down, a glance left, and a glance right, respectively, for the embodiment of FIG. 23.

In FIGS. 22A and 22B the tool spaces associated with the three-dimensional screen were located some distance away from the screen. In other embodiments, the tool spaces are located next to the three-dimensional object as shown in FIG. 23. In FIG. 23, screen object 600 is connected to four tool spaces that are identified as left space 602, top space 604, right space 606, and bottom space 608. When the user's virtual body 610 is positioned in front of screen object 600, it produces the initial or primary view shown in FIG. 24A. Note that in this initial view, none of the tool spaces are visible.

Figure 24B:
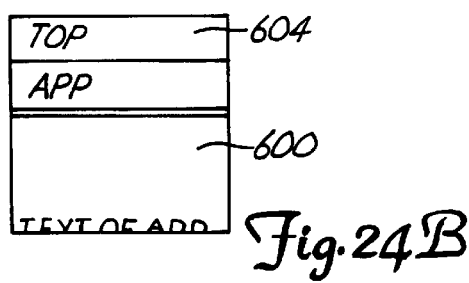
Figure 24D:
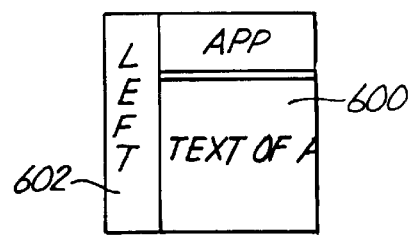
Figure 24C:
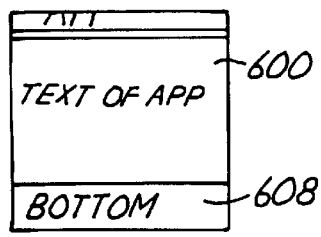
Figure 24E:
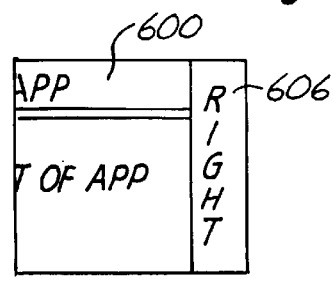

If the user initiates a glance upward, the view rotates upward to show top space 604, as shown in FIG. 24B. Similarly, if the user initiates a glance downward, or to the left, or to the right, the view rotates in those respective directions to show bottom space 608, left space 602 and right space 606, respectively as shown in FIGS. 24C, 24D, and 24E, respectively.

Figure 25A:
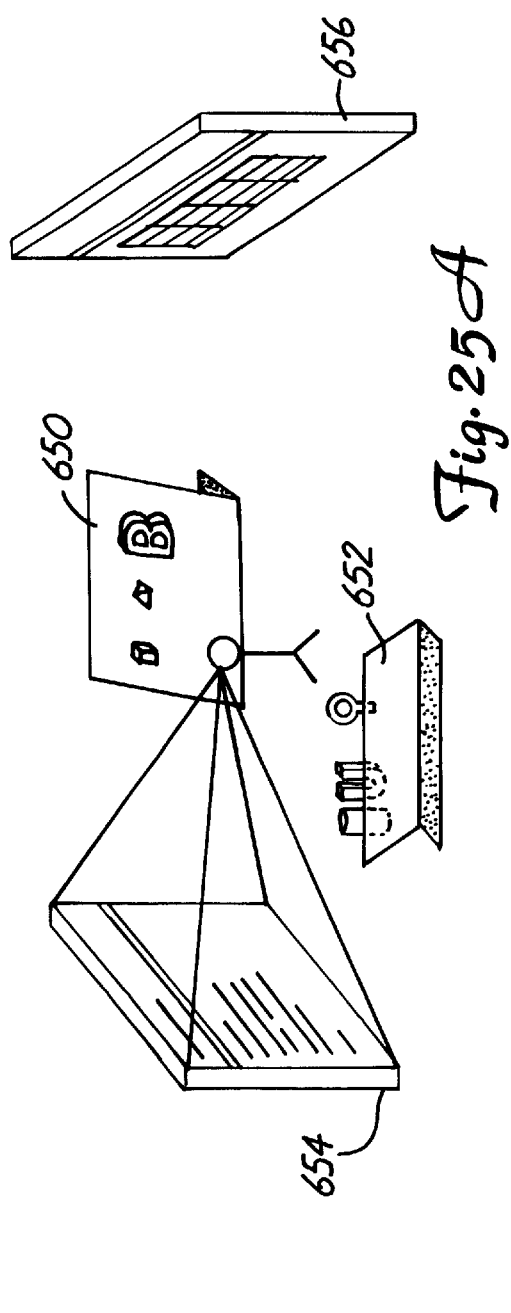
FIGS. 25A and 25B show a change in the tool spaces inherited by the user's vehicle for two different screen objects.
Figure 25B:
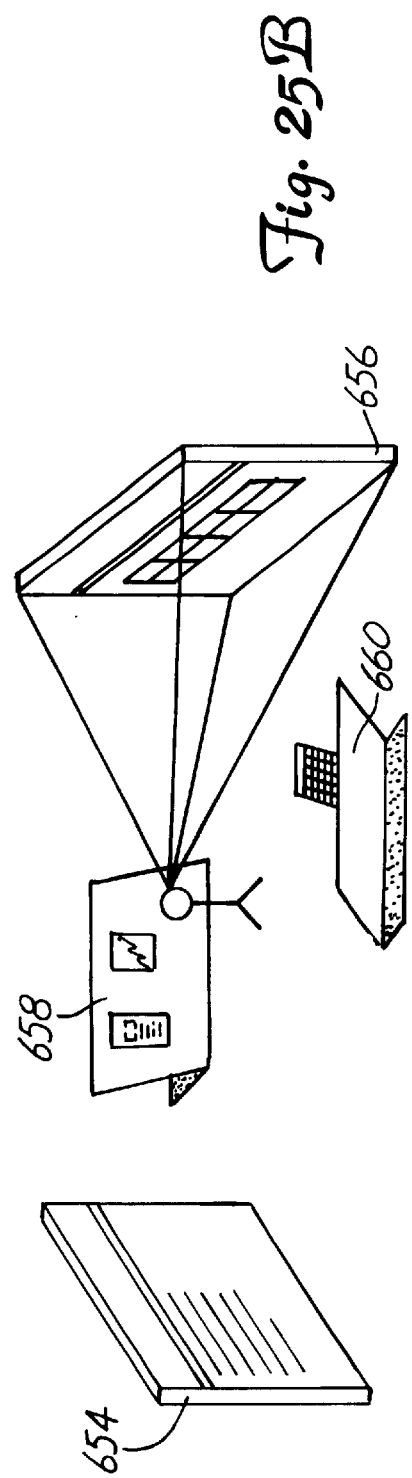

Since tool spaces can be associated with three-dimensional objects, the user can switch between tool spaces simply by moving in front of different objects. For example, in FIG. 25A the user can access tool spaces 650 and 652 that are associated with screen object 654. By turning the vehicle so it points at screen object 656, as shown in FIG. 25B, the user can access tool spaces 658 and 660, which are associated with screen object 656. Thus, if screen object 654 provides a view of a word-processing application and screen object 656 provides a view of a spread-sheet application, tool spaces 650 and 652 can contain word-processing tool objects and tool spaces 658 and 660 can contain spread-sheet tool objects. Thus, the appropriate tools and tool spaces are automatically provided to the user when they approach a screen object. In addition, under some embodiments, the number of tool spaces and/or the location of tool spaces can change depending on the location of the virtual body.

Figure 26A:
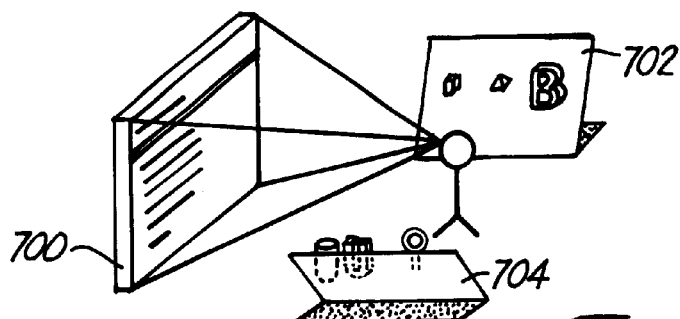
FIGS. 26A, 26B, and 26C show changes in the tool spaces of the user's vehicle when screen objects approach the user's vehicle.
Figure 26B:
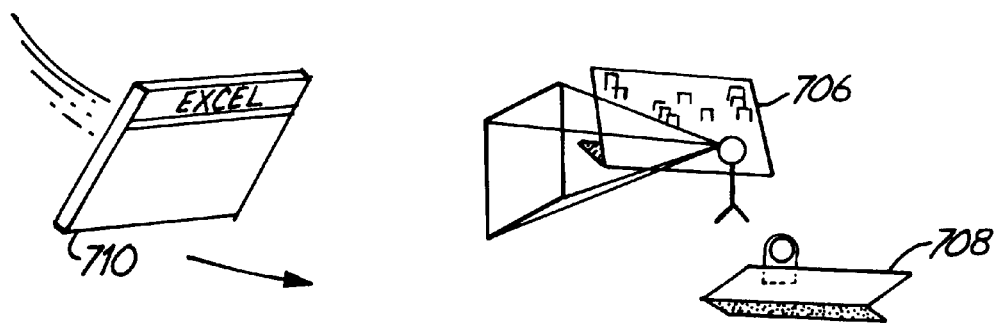
Figure 26C:
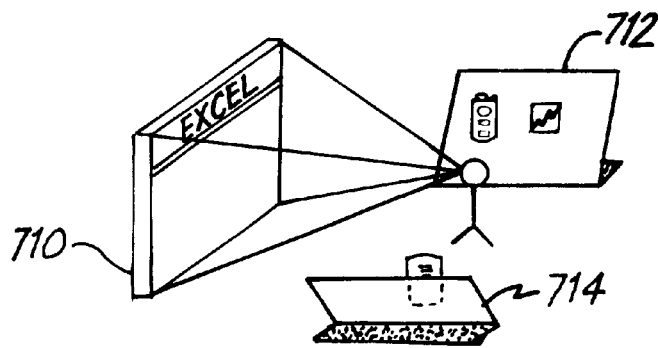

Instead of having the user's virtual body move to a three-dimensional object in the three-dimensional environment, it is possible under an embodiment of the invention to have a three-dimensional object approach the user's virtual body. FIGS. 26A, 26B, and 26C show a sequence of states of the three-dimensional environment that are useful in describing changes in the tool spaces of one embodiment of the invention when three-dimensional objects approach the user's virtual body.

In FIG. 26A, the user's virtual body is in front of a screen object 700 and has inherited tool spaces 702 and 704, which are associated with screen object 700. In FIG. 26B, screen object 700 has been dismissed, and the user's virtual body is associated with its default tool spaces 706 and 708. Also in FIG. 26B, new-screen object 710 is shown moving toward the user's virtual body. In FIG. 26C, new-screen object 710 is stationary in front of the user's virtual body and the user's virtual body has inherited tool spaces 712 and 714 associated with new-screen object 710.

Figure 27A:
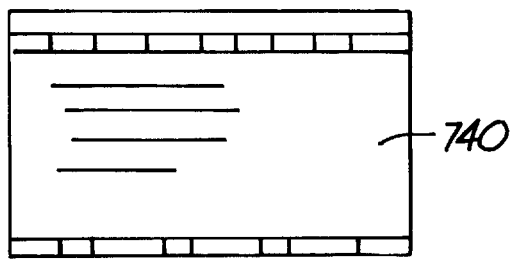
FIGS. 27A, 27B, 27C, and 27D show a view of a two-dimensional environment of the present invention having a hidden tool space.
Figure 27B:
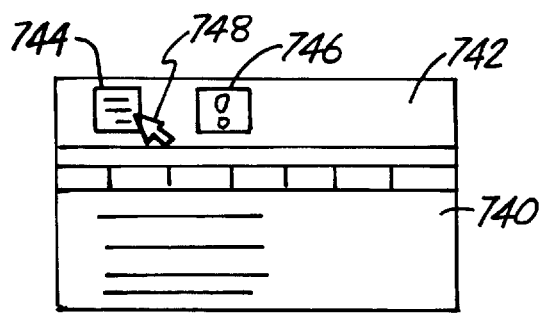

The ability to manipulate objects in a normally hidden tool space is also applied to two-dimensional environments in one embodiment of the invention. Such an embodiment is shown in FIGS. 27A, 27B, 27C, and 27D. In FIG. 27A a primary view of a two-dimensional screen 740 is shown. Screen 740 can include a full display of an application such as Word or Excel from Microsoft Corporation. In FIG. 27B, the user has initiated a glance upward. This causes the primary view to shift downward. As the primary view shifts downward it reveals tool space 742 that is hidden from the primary view. Tool space 742 contains two objects or tools 744 and 746. With the tool space revealed, the user places cursor 748 over object 744 and selects the object by depressing a button on the input device.

Figure 27C:
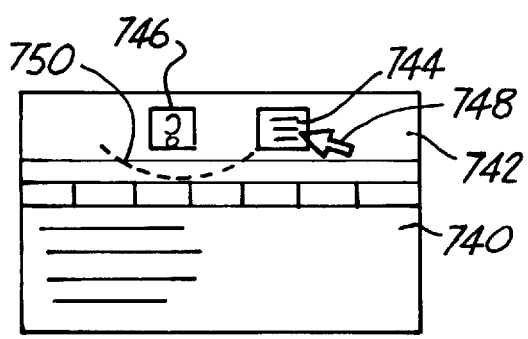
Figure 27D:
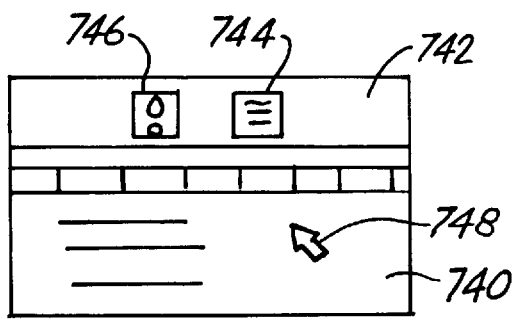

In FIG. 27C, the user has moved object 744 to a new position in tool space 742 along a path 750. In FIG. 27D, the user has released the button on the input device, severing the sink between cursor 748 and object 744. The user has also moved cursor 748 into screen 740. The user then releases the glance, thereby returning to the primary view of FIG. 27A.

Although the present invention has been described with reference to particular embodiments, workers skilled in the art will recognize that changes may be made in form and detail without departing from the spirit and scope of the invention.

What is claimed is:

1. A method for generating an interface in a personal computer system having a display, a primary input device, and a secondary input device, the method comprising:
    displaying a primary view of a three-dimensional environment from the perspective of a virtual body positioned in the three-dimensional environment;
    displaying an animated change in the three-dimensional environment shown in the primary view to correspond to movement of the virtual body as the user manipulates the primary input device; and
    displaying a tool space by view by displaying an animated movement of a three-dimensional tool space into view based on a user manipulation of the secondary input device, the three-dimensional tool space being hidden from the primary view for all positions and orientations of the vehicle in the three-dimensional environment.

2. The method of claim 1 wherein displaying a tool space view comprises displaying an animated rotation that changes the view of the three-dimensional environment.

3. The method of claim 1 wherein displaying a tool space view comprises displaying a tool space associated with the virtual body such that the same tool space is displayed at a plurality of virtual body positions in the three-dimensional environment.

4. The method of claim 1 wherein displaying a primary view comprises displaying a three-dimensional object in the three-dimensional environment and wherein displaying a tool space view comprises displaying a tool space associated with the three-dimensional object in the primary view.

5. The method of claim 4 wherein displaying a tool space view comprises displaying a tool space associated with the virtual body when the virtual body is positioned away from a three-dimensional object and displaying a tool space associated with the three-dimensional object when the virtual body is proximate the three-dimensional object.

6. The method of claim 4 wherein displaying a tool space view comprises displaying a tool space associated with a first three-dimensional object in the three-dimensional environment when the virtual body is positioned near the first three-dimensional object and displaying a tool space associated with a second three-dimensional object in the three-dimensional environment when the virtual body is positioned near the second three-dimensional object.

7. The method of claim 4 wherein displaying a tool space view comprises displaying a tool space associated with the three-dimensional object as being attached to the three-dimensional object.

8. The method of claim 4 wherein displaying a tool space view comprises displaying a tool space associated with the three-dimensional object as moving with the three-dimensional object.

9. The method of claim 1 wherein displaying a tool space view comprises displaying an animated movement of a fixed amount such that the user does not control where the tool space appears in the view.

10. The method of claim 1 further comprising re-displaying the primary view by displaying an animated movement of the three-dimensional tool space out of view.

11. The method of claim 1 wherein the three-dimensional tool space contains two-dimensional objects.

12. The method of claim 1 wherein the three-dimensional tool space contains three-dimensional objects.

13. The method of claim 12 wherein displaying a primary view further comprises displaying a an object in the three-dimensional environment as the user selects the object and wherein displaying a tool space view comprises displaying an animated rotation of the object into the three-dimensional tool space.

14. The method of claim 13 wherein displaying the animated movement of the object into the three-dimensional tool space further comprises changing a property of the object during the animated movement.

15. The method of claim 14 wherein changing a property of the object comprises changing the appearance of the object.

16. The method of claim 14 further comprising:
redisplaying the primary view of the three-dimensional environment;
displaying an animated change in the three-dimensional environment shown in the primary view to correspond to movement of the virtual body as the user manipulates the primary input device;
redisplaying the tool space view;
displaying an object in the tool space as the user selects the object;
displaying an animated movement of the object into the three-dimensional environment from the tool space.

17. The method of claim 12 wherein displaying a tool space view further comprises displaying an object in the three-dimensional tool space as the user selects the object and wherein the method further comprises displaying an animated movement of the object into the three-dimensional environment from the tool space.

18. The method of claim 12 wherein displaying a tool space view further comprises displaying a an object in the three-dimensional tool space as the user selects the object and moving the object in the three-dimensional tool space based on the user's manipulation of the primary pointing device.

19. A computer-readable medium having instructions for performing computer-executable steps related to a computer-generated three-dimensional environment, the computer-generated three-dimensional environment including a computer-generated view of the three-dimensional environment, the steps comprising:
creating a tool space programming object having a position property that describes the position of a three-dimensional tool space in the three-dimensional environment, the position property set to an initial position;
changing the view in response to an input value from a primary input device so that the view is directed toward the initial position of the three-dimensional tool space;
updating the position property of the tool space while the view is changing toward the initial position such that a majority of the three-dimensional tool space remains out of the computer-generated view;
bringing the three-dimensional tool space into the computer-generated view in response to an input value from a secondary input device.

20. The computer-readable medium of claim 19 wherein the step of bringing the three-dimensional tool space into the computer-generated view comprises changing the view so that the view is directed toward the position of the three-dimensional tool space while maintaining the position of the tool space.

21. The computer-readable medium of claim 19 wherein the step of bringing the three-dimensional tool space into the computer-generated view comprises changing the position of the three-dimensional tool space to a position within the computer-generated view.

22. The computer-readable medium of claim 19 wherein the step of bringing the three-dimensional tool space into the computer-generated view comprises gradually bringing the three-dimensional tool space into the computer-generated view such that a user perceives movement.

23. The computer-readable medium of claim 19 comprising instructions for performing further steps of changing an origination point for the computer-generated view and updating the position of the tool space such that the tool space is kept in the same position relative to the origination point.

24. The computer-readable medium of claim 20 wherein bringing the three-dimensional tool space into the computer-generated view comprises changing the computer-generated view by a fixed amount such that the user does not control where the three-dimensional tool space appears in the three-dimensional view.

25. The computer-readable medium of claim 19 comprising instructions for performing further steps comprising:
creating a tool programming object having a position property that identifies the position of a three-dimensional tool in the three-dimensional environment; and
setting the position property of the tool programming object such that the three-dimensional tool appears in the three-dimensional tool space.

26. The computer-readable medium of claim 25 comprising instructions for performing further steps comprising:
moving a displayed cursor over a three-dimensional tool that appears in a three-dimensional tool space;
linking the three-dimensional tool to the displayed cursor based on an input from the primary input device such that the three-dimensional tool moves with the cursor; and
moving the cursor and the three-dimensional tool in response to input from the primary input device.

27. The computer-readable medium of claim 26 wherein moving the cursor and the three-dimensional tool comprises moving the cursor and the three-dimensional tool within the tool space.

28. The computer-readable medium of claim 26 wherein moving the cursor and the three-dimensional tool comprises moving the cursor and the three-dimensional tool out of the tool space and into the three-dimensional environment.

29. The computer-readable medium of claim 28 comprising instructions for performing a further step comprising changing a property of the three-dimensional tool as it moves from the tool space into the three-dimensional environment.

30. The computer-readable medium of claim 29 wherein changing a property comprises changing an appearance property of the three-dimensional tool.

31. A method for generating an interface in a personal computer system having a display and a primary input device, the method comprising:
displaying a two-dimensional computer-generated view of a screen;
shifting the computer-generated view to display a tool space containing graphical items, the tool space being hidden from the computer-generated view of the screen;
moving a cursor over a graphical item based on input values from the primary input device; and
moving the graphical item and the cursor together based on an additional input from the primary input device.

32. The method of claim 31 wherein moving the graphical item and the cursor comprises moving the graphical item and the cursor within the tool space.

33. The method of claim 31 wherein moving the graphical item and the cursor comprises moving the graphical item and the cursor from the tool space to the screen.

34. The method of claim 33 wherein moving the graphical item and the cursor from the tool space to the screen comprises changing a property of he graphical item as it is moved from the tool space to the screen.

35. A computer-readable medium having computer-executable instructions for performing steps related to a display, the steps comprising:

displaying a view of a two-dimensional screen;

shifting the view of the two-dimensional screen to reveal a tool space containing a graphical item;

moving a cursor over the graphical item in response to an input from an input device; and moving the graphical item and the cursor together in response to an additional input from the input device.

36. The computer-readable medium of claim 35 wherein moving the graphical item and the cursor comprises moving the graphical item and the cursor within the tool space.

37. The computer-readable medium of claim 35 wherein moving the graphical item and the cursor comprises moving the graphical item and the cursor from the tool space to the screen.

38. The computer-readable medium of claim 37 wherein moving the graphical item and the cursor from the tool space to the screen comprises changing a property of the graphical item as it is moved from the tool space to the screen.

39. A method of generating an interface in a personal computer having a display, the method comprising:

displaying a primary view of an environment, the primary view comprising at least one graphical object;

moving a cursor over the graphical object in response to input values from an input device;

the cursor and the graphical object together toward a tool space outside of the primary view in response to input values from an input device; and changing a property of the graphical object as it is moved toward the tool space.

40. The method of claim 39 wherein moving the cursor and the graphical object together toward a tool space comprises shifting the primary view to reveal the tool space.

41. The method of claim 39 wherein the environment is a three-dimensional environment.

42. The method of claim 41 wherein the tool space is a three-dimensional object in the three-dimensional environment.

43. The method of claim 42 wherein changing a property of the graphical object comprises changing the appearance of the graphical object.

44. The method of claim 43 wherein changing the appearance of the graphical object comprises changing the appearance of the graphical object from a three-dimensional object to a two dimensional object.

45. The method of claim 43 wherein changing the appearance of the graphical object comprises changing the appearance of the graphical object from a three-dimensional object to text.

46. A computer-readable medium having computer-executable instructions for performing steps related to a display, the steps comprising:

displaying a primary view of an environments, the primary view comprising at least one graphical object;

moving a cursor over the graphical object in response to input values from an input device;

moving the cursor and the graphical object together toward a tool space outside of the primary view in response to input values from an input device; and changing the appearance of the graphical object as it is moved toward the tool space.

* * * * *